US012640047B2

(12) United States Patent　　(10) Patent No.: US 12,640,047 B2

Le Chevalier　　(45) Date of Patent: May 26, 2026

(54) SYSTEM AND METHOD FOR GENERATING AND DELIVERING AUTOMATED ORAL SUMMARY OF LEARNING ACTIVITIES

(71) Applicant: Chegg, Inc., Santa Clara, CA (US)

(72) Inventor: Vincent Le Chevalier, Waikoloa, HI (US)

(73) Assignee: Chegg, Inc., Santa Clara, CA (US)

( * ) Notice: Subject to any disclaimer, the term of this patent is extended or adjusted under 35 U.S.C. 154(b) by 622 days.

(21) Appl. No.: 18/164,412

(22) Filed: Feb. 3, 2023

(65) Prior Publication Data

US 2024/0265822 A1　　Aug. 8, 2024

(51) Int. Cl.
G09B 5/04　　(2006.01)

(52) U.S. Cl.
CPC ..................................... G09B 5/04 (2013.01)

(58) Field of Classification Search
CPC ... G09B 5/00; G09B 5/06; G09B 7/00; G09B 17/00
See application file for complete search history.

(56) References Cited

U.S. PATENT DOCUMENTS

| | | | | |
|---|---|---|---|---|
| 11,699,027 B1 * | 7/2023 | Wu | ......................... | G06F 40/56 |
| | | | | 715/254 |
| 2020/0320890 A1 * | 10/2020 | Kumar Agrawal | ..... | G06F 3/015 |

FOREIGN PATENT DOCUMENTS

WO　　WO-2017109759 A1 *　　6/2017　　............. G09B 5/062

* cited by examiner

*Primary Examiner* — Robert J Utama
(74) *Attorney, Agent, or Firm* — Sheppard Mullin Richter & Hampton LLP

(57) ABSTRACT

In an embodiment, a method for automatically providing an oral summary based on learning activities includes obtaining data associated with one or more learning activities of a user on the online education platform, the data indicating one or more content items associated with the learning activities; extracting one or more concepts associated with the learning activities of the user; generating a text content record based on the one or more extracted concepts; generating an oral summary of the one or more extracted concepts based on the text content record; receiving, from one or more client devices associated with the user, physiological data of the user; detecting a triggering event based at least in part on the physiological data; and in response to detecting the triggering event, sending the oral summary to the one or more client devices for streaming to the user.

20 Claims, 9 Drawing Sheets

SYSTEM AND METHOD FOR GENERATING AND DELIVERING AUTOMATED ORAL SUMMARY OF LEARNING ACTIVITIES

TECHNICAL FIELD

This application generally relates to automatic generation and delivery of oral summaries of users' learning activities.

BACKGROUND

Online education platforms enable a student to access various educational content and engage in various learning activities through personal computing devices and Internet connections. The online learning activities include, for example, reading text-based books and notes, consuming multimedia content such as lectures, communicating in real time with instructors, and taking tests and examinations, etc.

It has been widely accepted that sleep supports the formation of long-term memory, and generally increasing previous learning and experiences recalls. Various studies have shown that sleeping after processing new information aids a person's learning of the new information. However, under current scenarios, in order to engage in studying activities prior to sleep, a learner needs to take proactive actions such as taking out a book, turning on a computer to review a lecture, or reviewing personal notes. The requirement of these actions may create barriers for the learner to study prior to sleep. Furthermore, the user-selected studying activities may or may not be related to or optimized for the content learned during the day, and thus may or may not be optimally effective.

SUMMARY

Various embodiments of the specification include, but are not limited to, systems, methods, and non-transitory computer readable media for automatic generation and delivery of oral summaries of learning activities.

According to one embodiment, a system for automatically providing an oral summary based on learning activities comprises one or more processors and a non-transitory computer readable medium storing instructions that, when executed by the one or more processors, cause the system to perform operations. The operations comprise obtaining, from an online education platform, data associated with one or more learning activities of a user on the online education platform, the data indicating one or more content items associated with the learning activities; extracting one or more concepts associated with the learning activities of the user using a machine-learning model, wherein the machine-learning model is configured to assign the one or more concepts to the one or more content items; generating a text content record based on the one or more extracted concepts, wherein the text content record comprises the one or more extracted concepts and content related to each of the one or more extracted concepts; generating an oral summary of the one or more extracted concepts based on the text content record; receiving, from one or more client devices associated with the user, physiological data of the user; detecting a triggering event based at least in part on the physiological data; and in response to detecting the triggering event, sending the oral summary to the one or more client devices for streaming to the user.

In some embodiments, detecting a triggering event based at least in part on the physiological data comprises determining, based on the physiological data, that the user is in at least one of a plurality of target wellness conditions. The target wellness conditions include one or more of laying down in a horizontal position, having no motion for a preset period, breathing slowly, or having a slow heart rate.

In some embodiments, the operations further comprise detecting, based at least in part on the physiological data, that at least one of one or more termination events has occurred, wherein the one or more termination events comprise that the user has fallen asleep or that the user has exited the at least one target wellness condition and in response to detecting the termination event, sending an instruction to the one or more client devices to terminate the streaming of the oral summary.

In some embodiments, each of the one or more client devices is configured to collect the physiological data of the user or to play back the oral summary. The one or more client devices comprise at least one of a smart watch, a smart phone, a connected finger ring, a connected mattress, a connected pillow, a connected speaker, or a connected audio headset.

In some embodiments, generating an oral summary of the one or more extracted concepts comprises generating the oral summary based on one or more preference settings of the user. The preference settings comprise at least one of a maximum duration of the oral summary, a maximum number of concepts in the oral summary, a number of repetitions of the oral summary, a characteristic of the voice in which the oral summary is rendered, a speech property of the text-to-speech conversion, or an acoustic effect to be included in the oral summary.

In some embodiments, generating a text content record based on the one or more extracted concepts comprises determining an order of the extracted concepts based on at least one of the following factors: a course associated with each extracted concept, a timing of a learning activity associated with each extracted concept, a level of difficulty of each extracted concept, or a type of content item to which each extracted concept is assigned.

In some embodiments, the operations further comprise receiving one or more calendar settings from the user, the one or more calendar settings specify one or more times for automatically streaming oral summaries to the user; determining that a current time is one of the one or more times for automatically streaming oral summaries to the user; and sending the oral summary to the one or more client devices for streaming to the user. In some embodiments, the operations further comprise receiving one or more calendar settings from the user, the one or more calendar settings specify one or more periods in which automatic streaming of oral summaries is permitted; determining, based on physiological data of the user, that a triggering event occurs within a period specified by the one or more calendar settings; and sending the oral summary to the one or more client devices for streaming to the user.

In some embodiments, generating an oral summary of the one or more extracted concepts based on the text content record comprises generating one or more audio records associated with the text content record, wherein each of the one or more audio records is generated by text-to-speech conversion of a portion of the text content record corresponding to one of the one or more extracted concepts and the content related to the one extracted concept; and interleaving one or more acoustic effects between the one or more audio records to construct the oral summary.

According to another embodiment, a computer-implemented method for automatically providing an oral summary based on learning activities comprises obtaining, from an online education platform, data associated with one or more learning activities of a user on the online education platform, the data indicating one or more content items associated with the learning activities; extracting one or more concepts associated with the learning activities of the user using a machine-learning model, wherein the machine-learning model is configured to assign the one or more concepts to the one or more content items; generating a text content record based on the one or more extracted concepts, wherein the text content record comprises the one or more extracted concepts and content related to each of the one or more extracted concepts; generating an oral summary of the one or more extracted concepts based on the text content record; receiving, from one or more client devices associated with the user, physiological data of the user; detecting a triggering event based at least in part on the physiological data; and in response to detecting the triggering event, sending the oral summary to the one or more client devices for streaming to the user.

According to yet another embodiment, a non-transitory computer-readable storage medium for automatically providing an oral summary based on learning activities is configured with instructions executable by one or more processors to cause the one or more processors to perform operations. The operations comprise obtaining, from an online education platform, data associated with one or more learning activities of a user on the online education platform, the data indicating one or more content items associated with the learning activities; extracting one or more concepts associated with the learning activities of the user using a machine-learning model, wherein the machine-learning model is configured to assign the one or more concepts to the one or more content items; generating a text content record based on the one or more extracted concepts, wherein the text content record comprises the one or more extracted concepts and content related to each of the one or more extracted concepts; generating an oral summary of the one or more extracted concepts based on the text content record; receiving, from one or more client devices associated with the user, physiological data of the user; detecting a triggering event based at least in part on the physiological data; and in response to detecting the triggering event, sending the oral summary to the one or more client devices for streaming to the user.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

DETAILED DESCRIPTION

Figure 1:
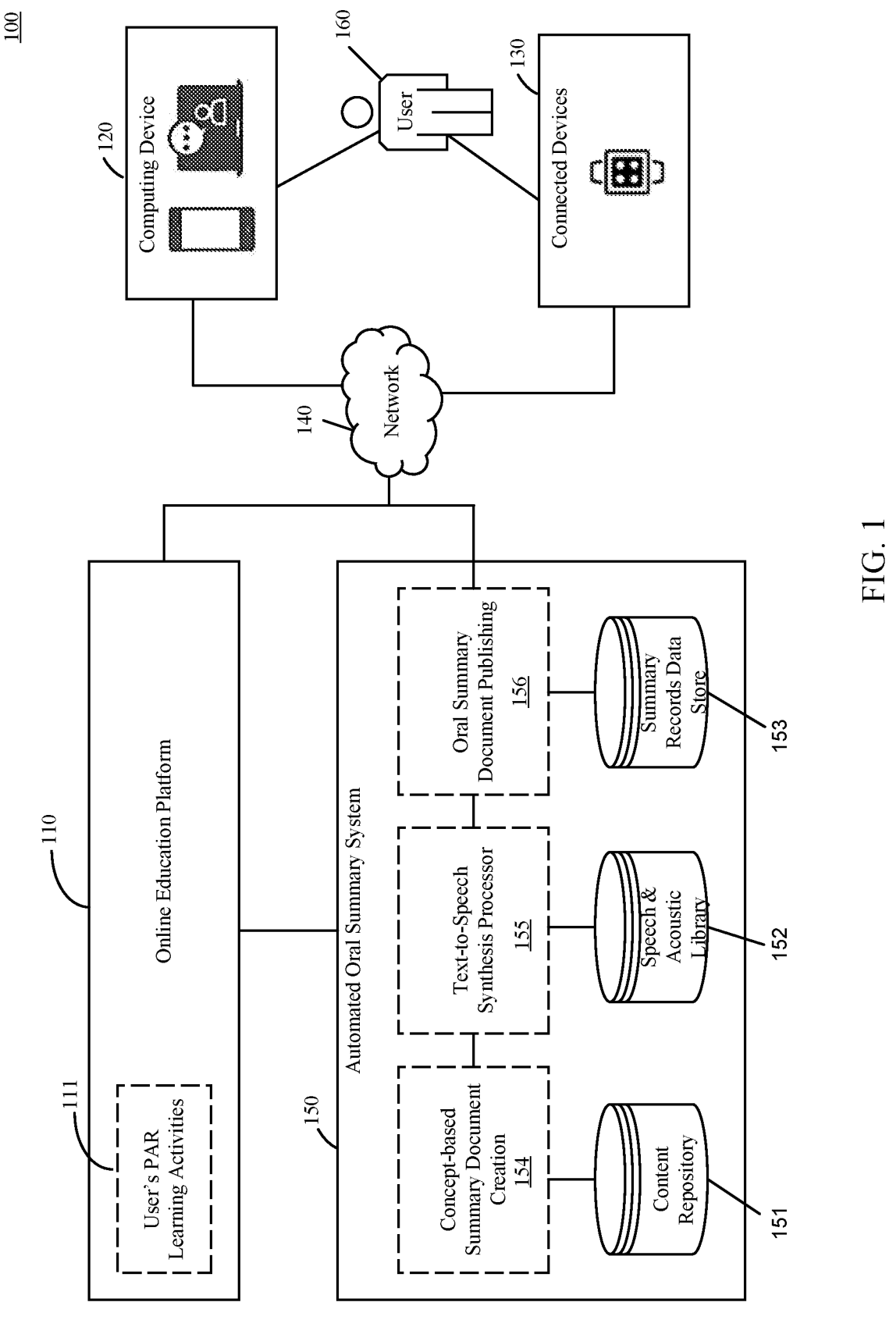
FIG. 1 illustrates an example network environment for automatically generating and delivering oral summary of learning activities.

Embodiments disclosed herein provide methods and systems for generating an automated oral summary of concepts learned by a user through learning activities on an online education platform and streaming the oral summary to the user's connected device (e.g., a smart watch). The oral summary is conditionally delivered to the user at pre-configured times or upon detection of pre-set user activities (e.g., resting, napping) based on data collected by motion or physiology sensors of the user's connected device. In some embodiments, based on the real-time data captured from these embedded sensors, the oral summary is delivered automatically before or during nighttime, when napping or relaxing or on-demand. The user may control the structure, scheduling and delivery of the oral summary through an application on the connected device.

The embodiments disclosed herein provides various technical benefits and improvements over the state of the art. First, the embodiments disclosed herein integrate data regarding a user's learning activities on an online education platform and sensor data from the user's connected devices through coordinated operations of the online education platform, an oral summary system, and the client devices of the user that are connected to each other over a network. This enables the oral summary system to stream an oral summary that is tailored to the user's learning activities on the online education system at an optimized time that is selected based on the user's movement and physiological data. Second, the embodiments disclosed herein offer intelligent and customizable provision of content by, for example, intelligently extracting concepts from a user's online learning activities and identifying other concepts associated with the extracted concepts, matching the identified concepts with supplemental content from both the online education platform and databases maintained by the oral summary system, improving the creation of content using machine-learning models, and facilitating the customization of the content based on user preferences by using markup languages to prepare the text content for generating the oral summary and selecting audio content from a speech and acoustic library. Third, the embodiments disclosed herein intelligently trigger the streaming of the oral summary to the user at times customizable by the user and based on real-time detection of movement or physiology events of the user. The embodiments further allow user control of streaming based on voice commands. This enables dynamic delivery of the oral summary to the user at times where the user is open to refreshing or learning the summarized concepts. Additionally, the embodiments disclosed herein stores content related to learned concepts and oral summaries in shared data stores that serve a plurality of users. This allows re-using generated content for different users that learn about the same concepts. This allows efficient generation and delivery of oral summary content and conserves processing power. Furthermore, the delivery of oral summaries through audio streams avoids the use of screens or monitors, thus providing additional energy savings.

FIG. 1 illustrates an example network environment 100 for automatically generating and delivering oral summary of learning activities. In some embodiments, methods and systems disclosed herein are implemented in a network environment 100 illustrated in FIG. 1. The network environment 100 may comprise an online education platform 110, a plurality of client-side computing devices 120, client-side connected devices 130, and an oral summary system 150 for automatic generation and delivery of oral summaries of learning activities. The components 110, 120, 130, and 150 of the network environment 100 may be connected to each other through one or more networks 140. Each of the client-side computing devices 120 and client-side connected devices 130 may be owned by a user 160. The online education platform 110 and the oral summary system 150 may be connected to a plurality of client-side devices respectively associated with a plurality of users.

The online education platform 110 may be implemented on one or more server-side computing devices. The online education platform 110 provides learning services to its registered users. The learning services may include passive learning services that provide content to be read, watched, or listened to by a learner, such as e-textbooks, flash cards, tutorial videos. The learning services may also include active learning services that provide content that is made for interaction with the learner, such as question & answers, quizzes, and interactive tutorials. The learning services may further include recall-type learning services that provide content used for testing the knowledge of the learner, such as tests. The learning activities of a user 160 may be referred to herein as PAR (i.e., passive, active, recall) learning activities. In some embodiments, the activities 111 performed by its users when accessing the online education services are captured by the online education platform 110 and shared with the oral summary system 150.

The oral summary system 150 may be implemented on one or more server-side computing devices. The oral summary system 150 may be configured to automatically generate oral summaries of learning activities occurring on the online education platform 110 and deliver the generated oral summaries to, for example, client-side connected devices 130 of users. The online education platform 110 may be configured to share records of a user's online learning activities 111 with the oral summary system 150. The oral summary system 150 may comprise one more subsystems or components. The subsystems may comprise, for example, a content repository 151, a speech and acoustic library 152, a summary records data store 153, a summary document creation system 154, a text-to-speech synthesis processor 155, and an oral summary document publishing system 156. In some embodiments, the summary document creation system 154 may create a summary document based on records of a user's online learning activities 111 received from the online education platform 110 and content retrieved from the content repository 151. The text-to-speech synthesis processor 155 may create an oral summary based on the summary document based on audio resources from the speech and acoustic library 152. The oral summary document publishing system 156 may store the generated oral summary in a summary records data store and send the oral summary to a client-side device, such as a client-side connected device 130, for playing to the user 160. In some embodiments, the oral summary system 150 may be implemented as part of the online education platform 110. Alternatively, the oral summary system 150 may be implemented on server-side devices separate from those hosting the online education platform 110.

The client-side computing devices 120 and client-side connected devices 130 may comprise one or more devices paired to the oral summary system 150 and one or more devices paired with the online education platform 110. One or more of the client-side devices may be paired with both the oral summary system 150 and the online education platform 110. One or more of the client-side computing devices 120 and client-side connected devices 130 may each comprise one or more sensors for collecting environmental, physiology, or motion data associated with the user and provide such data to the oral summary system 150. One or more of the client-side computing devices 120 and client-side connected devices 130 may be paired with the online education platform 110 through a network 140 to allow the user to access educational content on the online education platform 110. The client-side computing device 120 may comprise a smart phone, a personal computer, a laptop computer, a desktop computer, a virtual reality headset, an augmented reality headset, another suitable device, or any combination thereof. The client-side connected device 130 may comprise a smart watch, a smart phone, a connected finger ring, a connected mattress, a connected pillow, a connected speaker, a connected audio headset, another suitable device, or any combination thereof. A user's client-side computing device 120 may or may not be the same as the user's client-side connected device 130. In some embodiments, a user may use a client-side device (e.g., a client-side computing device 120) to access the online education platform 110 and another client-side device (e.g., a client-side connected device 130) to receive a stream of oral summary from the oral summary system 150. In other embodiments, a user may use the same client-side device (e.g., a smart phone) to access the educational content on the online education platform 110 and to receive a stream of oral summary from the oral summary system 150. In other words, the client-side computing device 120 and the client-side connected device 130 shown in FIG. 1 may be implemented as one device or multiple different devices.

In some embodiments, the client-side connected device 130 may integrate a speaker, a microphone, and one or more motion and physiology sensors among other embedded electronic components. The speaker may be configured to play back oral summaries received from the oral summary system 150. The microphone may be configured to capture one or more voice commands from the user 160 as well as one or more ambient sounds from the environment of the user 160. The motion and physiology sensors may be configured to detect one or more motions or physiological conditions of the user, including for example, body temperature, heart rate, breathing rate, blood pressure, body movement, one or more other suitable physiological conditions, or any combinations thereof.

The client-side connected device 130 may comprise and operate an oral summary application. The oral summary application may leverage a built-in speaker of the client-side connected device 130 to stream a published oral summary to the user 160. The oral summary application may receive one or more voice commands from the user through a built-in microphone of the client-side connected device 130. The oral summary application may further be paired with the online education platform 110 to synchronize the processing of the user's PAR learning activities with the processing of the automated oral summary. By having a tight integration between the online learning services and the oral summary services, a user 160 can listen to a streamed automated oral summary authored right after the learning of a new concept is completed. In some embodiments, the embedded motion and physiology sensors provide the oral summary application with real-time data from the user's physical activities. As such, these sensors are key to detect periods of inactivity, such as rest, nap, or sleep of a user 160. The data from these embedded sensors are captured by the oral summary application and the conditions detected from that data are uploaded to the oral summary system 150 to trigger the automated authoring and/or streaming of an automated oral summary based on the user's settings and preferences.

Figure 2:
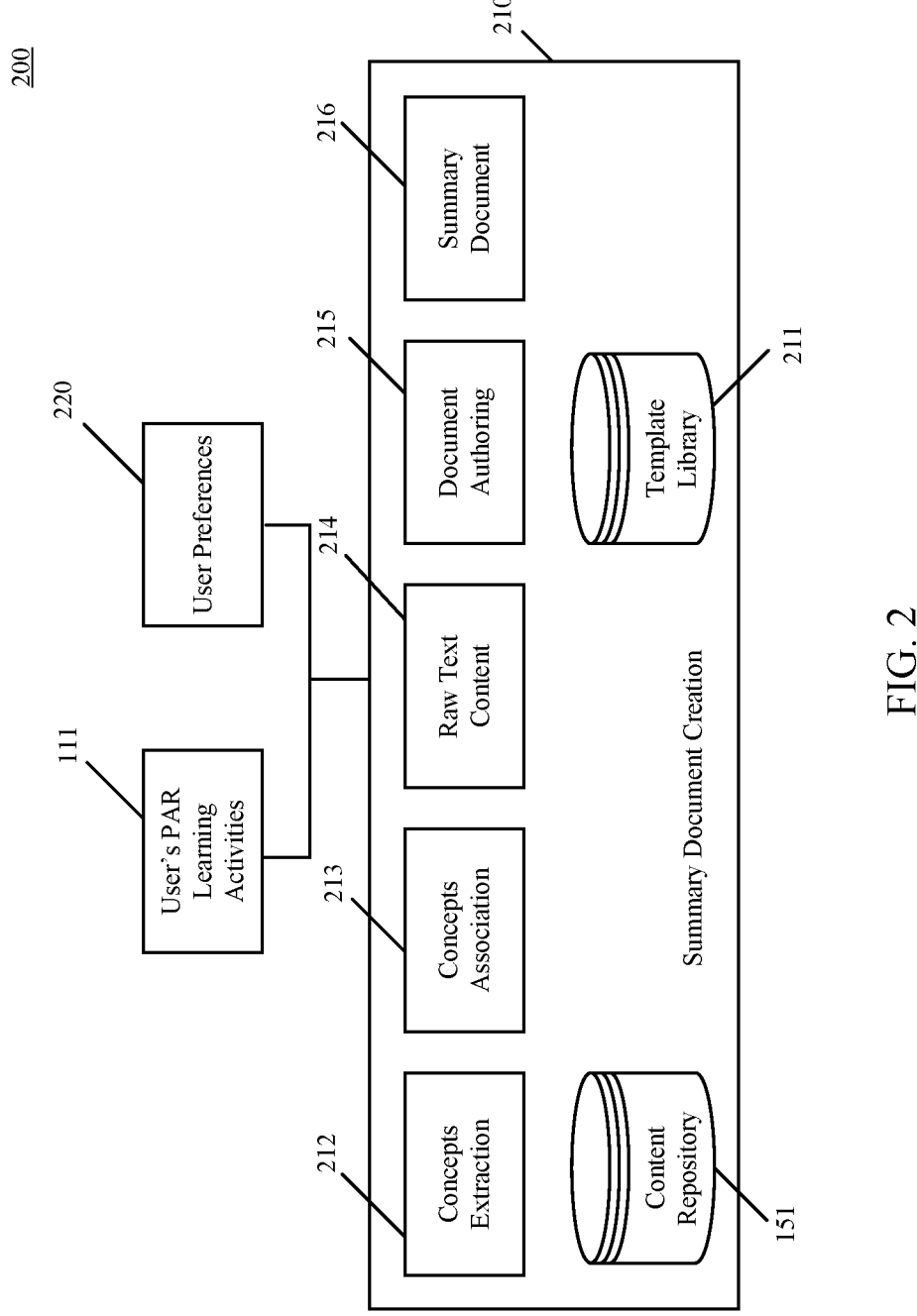
FIG. 2 illustrates an example system and process for creating a concept-based summary document.

FIG. 2 illustrates an example system 200 and process for creating a concept-based summary document. The system 210 in FIG. 2 may be implemented as the summary document creation system 154 in FIG. 1. The system 210 may receive as input records of a user's online learning activities 111 and one or more user preferences configured by the user 160.

In some embodiments, the user 160 may set preferences for a plurality of features of the oral summary generation and delivery process. The features include, for example, the type of content and PAR learning activities to be used for summary creation, prioritization of the recorded PAR activities, duration, selection of voice, properties of speech, automated scheduler, pairing of connected devices, other suitable features, or any combination thereof.

For the content summary creation, the user 160 may choose from any combination of content and types of learning activities recorded during the day by the online education platform 110. The user 160 may select content from available academic or professional domains, such as content of one or more particular subjects. The user 160 may further select one or more of passive, active, or recall activities. For example, a student 160 enrolled in a biology class may select learned content from the Biology101 eTextbook with a combination passive and active daily activities. In this example, the passive and active activities resulting from learning Biology101 are going to be selected for source of content to be processed by the oral summary system 150.

For the prioritization of PAR content activities to be selected for generating the oral summary, the user 160 may apply a number of filters to create a logical reordering of the learned concepts, such as "start with Course B concepts" then follow by "Course A concepts", "start with afternoon concepts then follow by morning or evening concepts", "start ordering based on my GPA/Grades", "start by the most complex/easy concepts" among many possible variations.

For duration, the user 160 may select a maximum amount of time for the oral summary to be streamed, or a maximum number of concepts to be included in each oral summary streaming. For example, the user 160 may specify the oral summary to be 15 minutes long, which limits the duration of oral summaries generated by the oral summary system 150. Based on this preference, the oral summary system 150 may control the number of concepts to be included in an oral summary, the amount of associated content paired with the concepts. The constraints on the amount of content may be determined based on the "speech rate" property of the selected voice from the text-to-speech synthesis processor 155. As another example, the user 160 may specify a finite number of concepts and associated content to be authored into the oral summary, such as 1, 3 or 5 concepts.

For the voice selection, the user 160 may choose from a library of pre-recorded voices covering a range of options in terms of voice types, pitch, speech rate and volume.

For the speech properties, the user 160 may customize the selected voice by applying a percentage differential, plus or minus, to its recorded properties. For examples, the pitch, speech rate and volume can each be adjusted by applying different percentages, hence modifying their original values for better customization.

For the scheduler, the user 160 may preset one or more daily scheduled times for oral summaries to be streamed. For instance, the user 160 may synchronize her weekday morning wakeup and bedtime alarm clock with the scheduler to automate the streaming time of the oral summary.

For the paired connected devices, the user may select at least one connected device to be capable of automatically receiving and playing streamed oral summaries. The selected connected device may be a client-side connected device 130 or a client-side computing device associated with the user 160.

In some embodiments, the online education platform 110 tracks and records online learning activities of a user 160 on the online education platform 110 and share records of such activities with the oral summary system 150. The user's activities on the online education platform 110 are classified into passive, active and recall content activities. The passive activities are defined by the educational or training content to be read, watched, or listened to by a user 160, such as pages of a textbook, online lecture, white paper, in paper or digital forms. In this mode, no new content gets created by the user 160. The active activities are defined by content made for interaction with by the user 160, such as, for example, taking notes, asking questions, running quizzes or interactive tutorials. In this mode, new content gets created by the user 160. The recall activities are defined as content specifically used for testing the knowledge of the learner, such as, for example, SAT, DMV, Excel or IQ tests. In this mode, new content gets created by the user 160.

In some embodiments, the oral summary system 150 creates a summary document 216 by performing a series of steps. The steps2 may be performed by corresponding tools of the summary document creation system 210. Examples of such steps are illustrated in FIG. 2.

The summary document creation system 210 may comprise a concept extraction tool 212. The concept extraction tool 212 may comprise one or more software algorithms implemented on and executed by one or more server-side devices associated with the oral summary system 150 as described below. The concept extraction tool 212 may be coupled with the content repository 151. The content repository 151 may store a plurality of content items corresponding to passive, active, and recall learning activities offered on the online education platform 110. The content repository 151 may store, for example, pages of a textbook, lecture videos, papers, notes, quizzes, interactive tutorials, examinations, tests, other suitable content, or any combination thereof. The concept extraction tool 212 may be configured to generate and assign concepts to every passive, active, recall content items in the content repository 151 using a machine-learning model. The machine-learning model may be learned model generated by a model trainer using an ensemble method, such as linear support vector classification, logistic regression, k-nearest neighbor, naïve Bayes, or stochastic gradient descent. As an example, for a particular chapter (e.g., chapter 1) in a particular book (e.g., Biology 101) in content repository 151, the concept extraction tool 212 may assign the following concepts: process of science, macromolecules, cell, membranes, energy, enzymes, cellular respiration, and photosynthesis. In response to receiving records of a user's daily PAR learning activities on the online education platform 110, the concept extraction tool 212 may extract concepts from content items interacted with by the user 160. In some embodiments, the concept extraction tool 212 may match content items interreacted with by the user 160 to content items stored in the content repository and identify concepts corresponding to the matched content items. In other embodiments, the concept extraction tool 212 may directly analyze content items interacted with by the user 160 using the machine-learning model to extract one or more concepts from the content items.

The summary document creation system 210 may comprise a concept association tool 213. The concept association tool 213 may comprise one or more software algorithms implemented on and executed by one or more server-side devices associated with the oral summary system 150 as described below. The concept association tool 213 may be configured to identify associations between concepts, e.g., the concepts extracted by the concept extraction tool 212. Using the identified associations, the concept association

214 may comprise one or more software algorithms implemented on and executed by one or more server-side devices associated with the oral summary system 150 as described below. In some embodiments, the raw text content tool 214 may be configured to create a raw text content record that is a listing of all concepts extracted from the recorded daily PAR learning activities of a user 160 and content related to the extracted concepts. The raw text content tool 214 may further include concepts determined to be associated with the extracted concepts and content related to such associated concepts in the generated raw text content record. This content record may comprise raw concept-based text content to be used for authorizing a summary document 216 for the user's online learning activities. The raw text content record is designed to a summary that typically highlights a limited number of predefined categories of information about each learned concept, such as its "Domain", "Name", "Definition", "My Notes", "Why is this useful" and "Non-interactive quiz", among other data fields. An example raw text content record for the concept "Pythagorean Theorem," which includes the concept "Pythagorean Theorem" and related content from passive and active learning activities, is shown below:

| Domain (Passive) | Concept Name (Passive) | Concept Definition (Passive) | My Notes (Active) | Why is this useful? (Active) | Quiz (Active) |
|---|---|---|---|---|---|
| Geometry | The Pythagorean Theorem | In a right-angled triangle: the square of the hypotenuse is equal to the sum of the squares of the other two sides. | It can be written in one short equation: $a^2 + b^2 = c^2$ | If I know the lengths of two sides of a right-angled triangle, I can find the length of the third side. | A "3, 4, 5" triangle has a right angle in it because: $3^2 + 4^2 = 5^2$ $9 + 16 = 25$ | tool 213 may generate concept pairs, where concepts in a concept pair are determined to be related to each other. For example, the concept association tool 213 may identify associations between concepts based on a principle that two concepts frequently appear in proximity to one another in content items are likely to be related. Accordingly, the concept association tool 213 may identify associations between concepts appearing in proximity to one another in the passive, active and recall content items of the content repository 151, such as concepts appearing on the same page, concepts appearing in the same section of two documents, concepts appearing in adjacent Q&As or concepts appearing in the same test. For example, the concept association tool 213 may apply an Apriori algorithm to identify concepts appearing in proximity to one another across multiple passive, active and recall content items.

In some embodiments, for concepts assigned to a particular passive, active or recall content item, the concept association tool 213 may generate an indicator of a relative strength of association between the concepts and the content item. For example, for a first concept that is very strongly associated with the particular document, the concept association tool 213 may assign, say, a score of 0.99, while for a second concept that is only mildly associated with the particular content item, the concept association tool 213 may assign a score of 0.4. In some embodiments, the concept association tool 213 may identify one or more concepts associated with one or more concepts extracted from content items interacted with by a user during a certain day's online learning activities. Such associated concepts may also be included in the oral summary streamed to the user.

The summary document creation system 210 may comprise a raw text content tool 214. The raw text content tool As illustrated in the above example, the raw text content record may comprise certain selected data fields. Other examples may include a different number, combination, or order of data fields, which may be configured based on user preferences. In some embodiments, the raw text content tool 214 may obtain the content used to fill the data fields of the raw text content record directly from information received from the online education platform 110 (e.g., content items included in the user's online learning activities 111) or from the content repository 151 by searching the content repository 151 based on the corresponding concept. In some embodiments, the raw text content tool 214 may create a raw text content record for each concept extracted in a default or configured time period (e.g., one day). In some embodiments, the order of raw text content records for different concepts may be based on the recorded time for the respective concepts during the day, such as Concept A recorded at 10:05 am, followed by Concept B recorded at 10:30 am, etc. In other embodiments, the user 160 may set preferences for selecting or ordering the concepts using a variety of filters such as "Give me only Passive Content", "Start with Course/Class A', "Start with Domain B", "Start with morning/afternoon/evening concepts", "Start with home location" or "Start ordering based on my GPA", "Repeat Summary N Times", among many possible variations. In some embodiments, the number of concepts for which raw text content records are generated are constrained by the user's settings regarding the maximum length of the automated oral summary. The raw text content tool 214 may limit the number of concepts included based on such time limitations. Alternatively or additionally, the raw text content tool 214 may also control the selection of data fields or the number of repetitions to satisfy the time limitations. The information in the raw text content record is later converted into a summary document 216 by a document authoring tool 215 and then into an oral (i.e., speech/acoustic content) summary by the text-to-speech synthesis processor 155.

The summary document creation system 210 may comprise a document authoring tool 215. The document authoring tool 215 may comprise one or more software algorithms implemented on and executed by one or more server-side devices associated with the oral summary system 150 as described below. The authoring tool 215 may automatically generate a summary document 216 based on the raw text content record and one or more templates selected from a library of templates 211. Each template specifies one or more data structures or formats that can be parsed by the text-to-speech synthesis processor 155 to generate an oral summary. The summary document 216 may be one or more of a plain text document, an XML document, a Speech Synthesis Markup Language (SSML) compatible document, or a parser (e.g., SABLE) for combining SSML, STML and JSML.

In some embodiments, the document authoring tool leverages a template library 211 of flashcard-like XML, or other markup language, templates to automatically ingest and render the summary document 216. For instance, a single concept and associated content can be authored into a single page XML document, or flashcard equivalent. A summary made of multiple concepts may be one XML document made of multiple single pages.

Taking SSML as an example, SSML is an XML-based markup language for speech synthesis applications and is a recommendation of the W3C's Voice Browser Working Group. Each SSML document is created with SSML elements, or tags, that provide support for various aspects of speech, such as pronunciation, volume, pitch, and speech rate. Other options include emphasizing specific words or phrases, using phonetic pronunciation, including breathing sounds, whispering, or using various speaking styles. SSML may specify markup elements for prosody, including markup for "pitch', "contour", "pitch range", "speech rate", "duration" and "volume". Normal punctuation, such as pausing after a period, or using the correct intonation when a sentence ends with a question mark are automatically handled.

Figure 3:
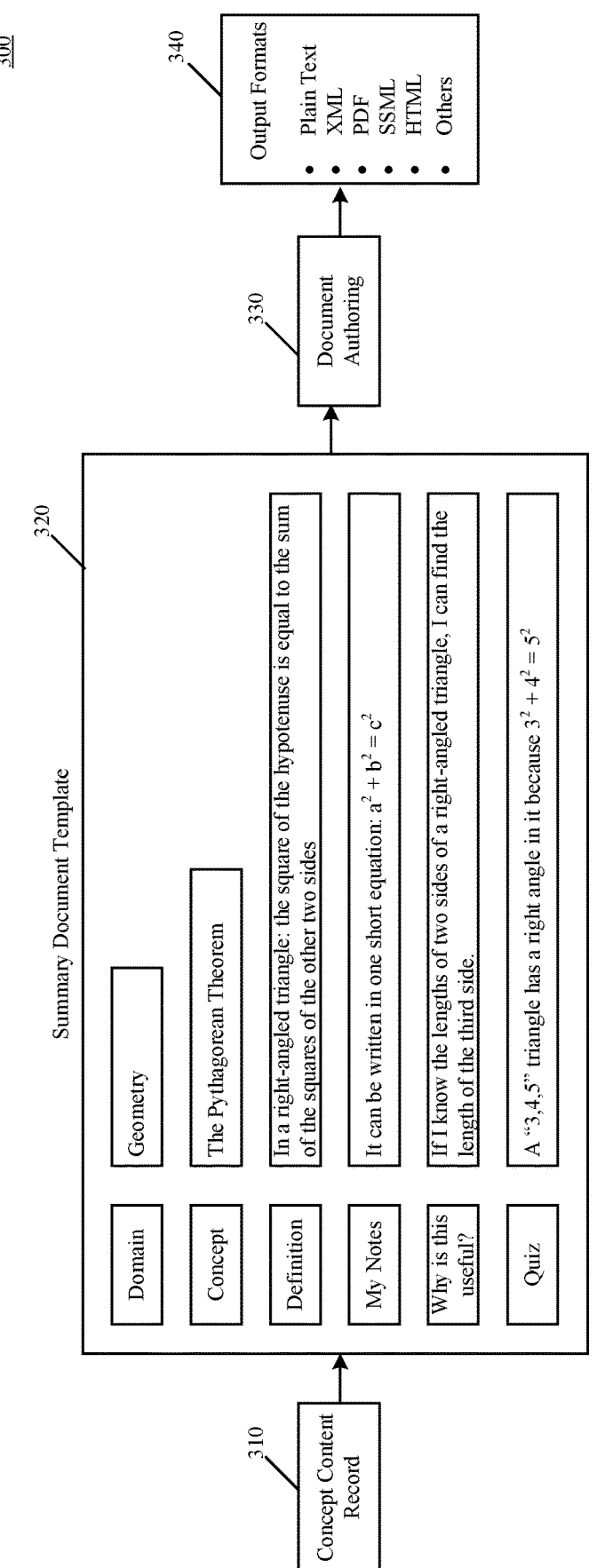
FIG. 3 illustrates an example process for authoring a summary document of a concept.

FIG. 3 illustrates an example process for authoring a summary document of a concept. At step 310, the oral summary system 150 may receive records of a user's online activities from the online education platform. The oral summary system 150 identify concepts related to the user's online learning activities and retrieve from the content repository 151 content associated with the concepts. At step 320, the oral summary system 150 may generate a raw text content record that includes the concepts and multiple related data fields. Then, at step 330, the oral summary system 150 may generate a summary document, which is output at step 340. The summary document may be generated using a flashcard-like template. The summary document may be output in one or more of formats including plain text, XML, PDF, SSML, HTML, other suitable formats, or any combination thereof. The summary document authored in this manner may be used to create an oral summary of the user's learning activities. Alternatively, the summary document may be used for other purposes. For example, the summary document may be published and consumed as digital or printed document by the user. An example of such a method is disclosed in U.S. patent application Ser. No. 13/898,377, titled "Automated Testing Materials in Electronic Document Publishing," filed May 20, 2013, which is incorporated by reference in its entirety.

Figure 4:
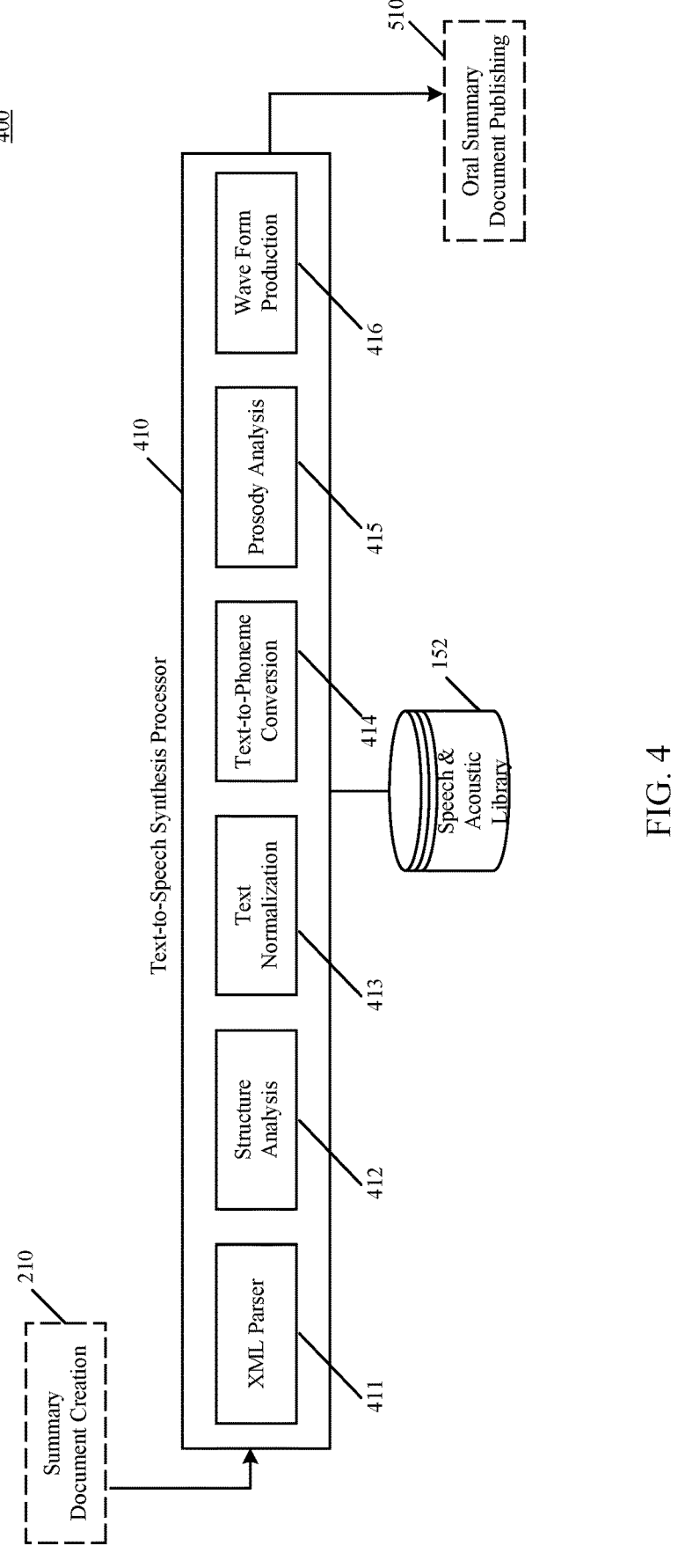
FIG. 4 illustrates an example text-to-speech synthesis processor and an example process for text-to-speech synthesis.

FIG. 4 illustrates an example text-to-speech synthesis processor and an example process for text-to-speech synthesis. The system 410 in FIG. 4 may be implemented as the text-to-speech synthesis processor 155 in FIG. 1. The system 410 may receive as input a summary document 216 generated and output by the summary document creation system 210.

In some embodiments, the text-to-speech synthesis processor 410 may convert written text to a phonemic representation, then converts the phonemic representation to waveforms that can be output as sound. Several type of synthesis methods may be applied ranging from standard TTS voices to Neural TTS for better customization and personalization. The summary document 216 may be provided either in plain text or in a markup format such as SSML, which provides support for various aspects of speech, such as pronunciation, volume, pitch, and speech rate. In the case where the summary document 216 is created in plain text, the text-to-speech synthesis processor 155 may automatically interpret the text and generate the oral summary. When the summary document is created in a markup language such as SSML, the text-to-speech synthesis processor 155 may create the oral summary based on markup (e.g., elements or tags) in summary document.

In some embodiments, the text-to-speech synthesis processor 410 may generate an oral summary from a summary document by performing a series of steps. In generating the oral summary, the text-to-speech synthesis processor 410 may interleave speech content data generated based on the summary document 216 with acoustic effects to generate the oral summary. The text-to-speech synthesis processor 410 may generate speech content data and acoustic effects using audio content retrieved from the speech and acoustic library 152. The steps may be performed by corresponding tools of the text-to-speech synthesis process 410. Examples of such steps are illustrated in FIG. 4.

In some embodiments, the markup language used by the document authoring tool 215 may be sufficiently rich to allow control over the final voice output. Alternatively, the summary document 216 may include partial markups, allowing the text-to-speech synthesis processor 410 to generate the voice output based on its settings or configurations. In general, the markup provides a way for the creator of the summary document 216 to make prosodic and other information available to the text-to-speech synthesis processor 410, typically information the text-to-speech synthesis processor 410 would be unable to acquire on its own. The text-to-speech synthesis processor 410 may then determine whether and in what way to use the information when creating the oral summary.

The text-to-speech synthesis processor 410 may comprise an XML parser 411. The XML parser 411 may comprise one or more software algorithms implemented on and executed by one or more server-side devices associated with the oral summary system 150 as described below. The XML parser 411 may be configured to process summary documents written in XML-based formats, such as SSML. The text-to-speech synthesis processor 410 may further include one or more other parsers for processing other suitable data formats. In some embodiments, the XML parser 411 may extract the document tree and content from the summary document 216 to obtain, for example, tags and attributes for use in the subsequent steps.

The text-to-speech synthesis processor 410 may comprise a structure analysis tool 412. The structure analysis tool 412 may comprise one or more software algorithms implemented on and executed by one or more server-side devices associated with the oral summary system 150 as described below. In some embodiments, the structure analysis tool 412 may analyze the summary document to determine structural patterns that may influence the way in which the summary document is to be read. Such structural patterns may include, for example, paragraphs and sentences that impact speaking patterns with respect to the document. In some embodiments, the structure analysis tool 412 may determine structures based on markups such as p and s elements defined in SSML. In other embodiments, for a summary document or parts of a summary document where markups are not used, the text-to-speech synthesis processor may infer the structure by automated analysis of the text, for example, using punctuation and other language-specific data.

The text-to-speech synthesis processor 410 may comprise a text normalization tool 413. The text normalization tool 413 may comprise one or more software algorithms implemented on and executed by one or more server-side devices associated with the oral summary system 150 as described below. In some embodiments, the text normalization tool 413 may convert the written form of the summary document (e.g., orthographic form) into a spoken form. For example, for English, when "$200" appears in a document it may be spoken as "two hundred dollars". Similarly, "½" may be spoken as "half", "January second", "February first", "one of two" and so on. The text normalization tool 413 converts the written language into tokens. The exact details of what constitutes a token are language specific. In English, tokens are usually separated by white space and are typically words. For languages with different tokenization behavior, the term "word" in this specification is intended to mean an appropriately comparable unit. Tokens in SSML cannot span markup tags except within the token and w elements. A simple English example is "cup<break/>board"; outside the token and w elements, the text-to-speech synthesis processor 410 may treat this as the two tokens "cup" and "board" rather than as one token word with a pause in the middle. Breaking one token into multiple tokens this way may affect how the processor 410 treats it. In some embodiments, when markups are available, the say-as element can be used in the summary document 216 to explicitly indicate the presence and type of these constructs and to resolve ambiguities. The set of constructs that can be marked may include dates, times, numbers, acronyms, currency amounts, other suitable constructs, or any combination thereof. Acronyms and abbreviations may also be handled by the author via direct text replacement or by use of sub-elements, e.g., "BBC" can be written as "B B C" and "AAA" can be written as "triple A". These replacement written forms will likely be pronounced as one would want the original acronyms to be pronounced. In other embodiments, when markups are unavailable, the text normalization tool 413 is configured to automatically locate and convert these constructs to a spoken language form. The conversion may be performed based on a trained material learning model.

The text-to-speech synthesis processor 410 may comprise a text-to-phoneme conversion tool 414. The XML parser 411 may comprise one or more software algorithms implemented on and executed by one or more server-side devices associated with the oral summary system 150 as described below. In some embodiments, once the text normalization tool 413 has determined the set of tokens to be spoken, the text-to-phoneme conversion tool obtains the tokens and derives pronunciations for each token. Pronunciations may be conveniently described as sequences of phonemes, which are units of sound in a language that serve to distinguish one word from another. Each language, and sometimes each national or dialect variant of a language, has a specific phoneme set. In some embodiments, when markups are available in the summary document 216, phoneme elements in such markups may allow a phonemic sequence to be provided for any token or token sequence. This provides the content creator with explicit control over pronunciations. The say-as element might also be used to indicate that text is a proper name that may allow a text-to-phoneme conversion tool 414 to apply special rules to determine a pronunciation. The lexicon and lookup elements can be used to reference external definitions of pronunciations. These elements can be particularly useful for acronyms and abbreviations that the processor is unable to resolve via its own text normalization and that are not addressable via direct text substitution or the sub element. In other embodiments, when markups of phoneme elements are not available, the text-to-phoneme conversion tool 414 may apply automated capabilities to determine pronunciations. The text-to-phoneme conversion tool 414 may determine pronunciations by looking up tokens in a pronunciation dictionary, which may be language-dependent, and applying rules to determine other pronunciations. In yet other embodiments, the summary document 216 may include notes or modifications from a human author of the corresponding content items. For example, authors may choose to perform some conversions themselves prior to encoding in SSML. Written words with indeterminate or ambiguous pronunciations could be replaced by words with an unambiguous pronunciation; for example, replacing the word "read," which have multiple possible pronunciations, with "reed."

The text-to-speech synthesis processor 410 may comprise a prosody analysis tool 415. The prosody analysis tool 415 may comprise one or more software algorithms implemented on and executed by one or more server-side devices associated with the oral summary system 150 as described below. In some embodiments, the prosody analysis tool 415 may process the phonemes provided by the text-to-phoneme conversion tool 414 to generate human-like prosody. Prosody is the set of features of speech output that includes the pitch (also called intonation or melody), the timing (or rhythm), the pausing, the speaking rate, the emphasis on words and other suitable features. In some embodiments, markups may be available in the summary document 216 including, e.g., emphasis elements, break elements and prosody element. The prosody analysis tool may use these markups to generate the prosodic features in the speech output. In other embodiments, in the absence of these elements, the prosody analysis tool 415 may automatically generating suitable prosody. This may be achieved through analysis of the document structure, sentence syntax, and other information that can be inferred from the summary document 216. Furthermore, the prosody analysis may further generate certain prosodies based on markups and other prosodies based on an automatic determination.

The text-to-speech synthesis processor 410 may comprise a waveform production tool 416. The waveform production tool 416 may comprise one or more software algorithms implemented on and executed by one or more server-side devices associated with the oral summary system 150 as described below. In some embodiments, the waveform production tool 416 may use the phonemes and prosodic information generated by aforementioned tools to produce an audio waveform. In some embodiments, the summary document may include markups of audio elements. The waveform production tool 416 may generate the waveform based on the audio elements, such as a particular voice (e.g., a young male voice) or specific voice qualities. The audio elements may allow for insertion of recorded audio data into the output stream, with optional control over the duration, sound level and playback speed of the recording. Rendering can be restricted to a subset of the document by using the trimming attributes on the speak element. In other embodiments, when markups of audio elements are unavailable, the default volume/sound level, speed, and pitch/frequency of both voices and recorded audio in the document may be set as that of the unmodified waveforms, whether they be voices or recordings.

In some embodiments, the text-to-speech synthesis processor 410 may generate the waveform that constitutes the oral summary based on one or more user preferences. For example, a user 160 may select a voice from a library of pre-computed voices. Each voice in the library may be defined by a set of properties, such as gender, volume, pitch, and speech rate delivery, which can be further tuned based on the user preferences. The voice library may include sets of standard voices as well as the voices of participating professor/instructors, famous people, or virtual characters.

For instance, the following table describes some adjustable properties of a specific voice.

| Gender | Volume (in dB) | Pitch Type (frequency) | Speech rate (words/minute) |
|---|---|---|---|
| Male, Female | Extra Soft, Soft, Medium, Loud, Extra Loud | Extra Low, Low, Medium, High, Extra high | Slow, Medium, Fast, Extra-fast |

In some embodiments, the text-to-speech synthesis processor 410 may generate the oral summary further based on the user's preferences regarding acoustic effects. The user 160 may select from a library of acoustic effects to be interleaved with the speech content data by the text-to-speech synthesis processor 410. For instance, the start and end of a "content record" may be marked by a specific acoustic effect, such a "play bell" for example. Similarly, acoustic effects can be selected to be interleaved between each content item within a content record, such as "play soft tone" for example.

Figure 5:
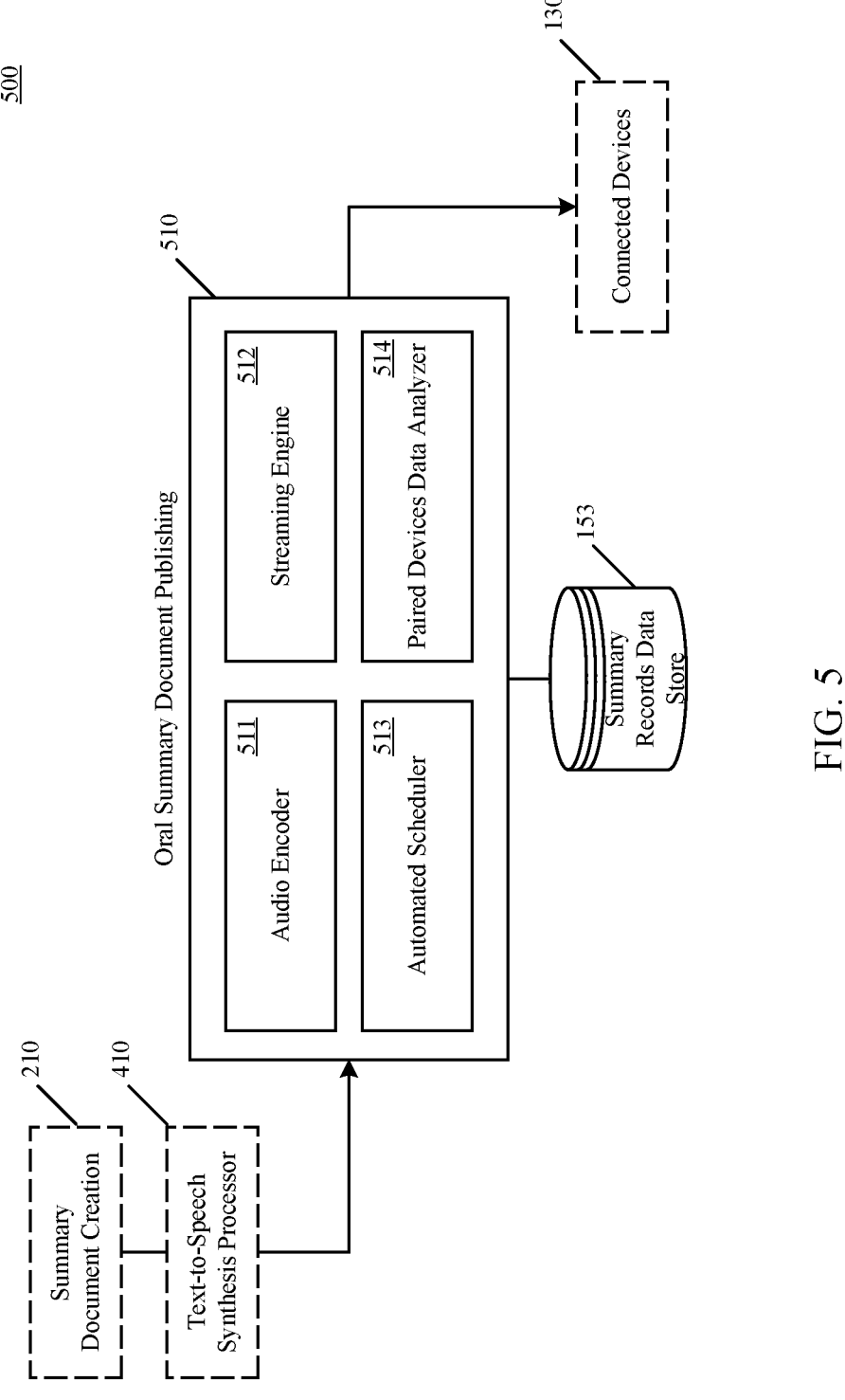
FIG. 5 illustrates an example system and process for publishing oral summary document.

FIG. 5 illustrates an example system and process for publishing oral summary document. The system 510 in FIG. 5 may be implemented as the oral summary document publishing system 156 in FIG. 1. The system 510 may receive as input an oral summary from the text-to-speech synthesis processor 410. In some embodiments, the oral summary document publishing system 510 may encode the oral summary into an audio file and stream the audio file to a client-side device (e.g., a client-side connected device 130). In addition to being streamed to a client-side device, the audio file may be stored in the summary records data store 153. The oral summary document publishing system 510 may comprise multiple tools configured to perform respective steps of the functionality of the summary document publishing system 510. Examples of such tools and steps are illustrated in FIG. 5.

In some embodiments, the oral summary document publishing system 510 may comprise an audio encoder 511. The audio encoder 511 may comprise one or more software algorithms implemented on and executed by one or more server-side devices associated with the oral summary system 150 as described below. The audio encoder 511 may encode and compress the oral summary into one or more suitable audio file formats, such as, for example, MP3, AAC, Vorbis, FLAC, Opus, other suitable formats, or any combination thereof. The encoded and compressed audio file may be streamed to the client-side connected device 130, which may decode, decompress, and playback the audio file. In some embodiments, the audio encoder 511 may select a bit rate to encode the oral summary. In general, the higher the bit rate, the better the quality of the audio file. For example, the sound of an MP3 file with a bit rate of 192 kbps is likely much better and clearer as of a file that only uses 32 kbps. The audio encoder 511 may select the bitrate within a range (e.g., 96 to 320 Kbps). In some embodiments, the audio encoder 511 may select the bit rate based on one or more user preferences or one or more requests from the client-side connected device 130. In other embodiments, the audio encoder 511 may select the bit rate based on one or more other factors, such as a status of a network connection between the oral summary system 150 and the client-side connected device 130.

In some embodiments, the oral summary document publishing system 510 may comprise a streaming engine 512. The streaming engine 512 may comprise one or more software algorithms implemented on and executed by one or more server-side devices associated with the oral summary system 150 to stream the audio file to client-side devices of users.

In some embodiments, the oral summary document publishing system 510 may comprise an automated scheduler 513. The automated scheduler 513 may comprise one or more software algorithms implemented on and executed by one or more server-side devices associated with the oral summary system 150 as described below. The automated scheduler 513 may manage the publishing calendar for oral summaries of learned concepts as generated by the text-to-speech synthesis processor 410 and encoded by the audio encoder 511. Based on the calendar, the automated scheduler may control the streaming engine 512 to stream audio files to a particular user's client-side connected device 130 at scheduled times.

In some embodiments, the automated schedule 513 may configure the calendar based on one or more user input received from one or more client-side devices (e.g., client-side computing device 120, client-side connected device 130). The user may preset times within a day, a week, a month on the calendar for triggering the construction and streaming of a new oral summary. For example, a user 160 may configure the scheduler 513 for streaming at 11 pm and 6 am every workday. This setting will configure the oral summary system 150 to construct and stream an oral summary at 11 pm every workday of the week and a repeat of the oral summary at 6 am the subsequent day, where each oral summary is generated based on the user's learning activities during the day of the 11 pm streaming.

As another example, a user 160 may configure the scheduler 513 for streaming at 8 am, 1 pm and 7 pm every workday. The configured times may correspond to that user's known schedule of morning transportation, quick power nap after lunch and quick power nap again after the last afternoon learning session. In this example, each oral summary may include different content, as the 8 am one would be based on the previous day learning, the 1 pm based on the morning learning activities and the 7 pm based either on the afternoon learning activities or the full day one. Each oral summary may be archived in the summary records data store 153 so that the user 160 can select them again as needed. In some embodiments, content of the oral summary may be divided into concept-based content modules and stored and indexed in the summary records data store 153. Future oral summaries may be generated by combining existing content modules stored in the summary records data store 153 or combining existing content modules with newly generated oral content.

As another example, a user 160 may request, using voice command for example, the streaming of an unscheduled oral summary, triggering the immediate streaming of a pre-authored oral summary if available, or the authoring and streaming of a new one, based on user's preferences and settings. Here, the user's voice command may be received by the oral summary application operating on the client-side connected device 130. The oral summary application may be coupled to the oral summary system 150 and configured to send a signal to the oral summary for streaming the oral summary upon receiving the user's voice command. In addition to triggering the streaming of an oral summary, the oral summary application may further accept other commands for controlling streams of oral summaries including, for example, Start, Pause, Resume, Stop, Replay, Next, Louder, Quieter, Faster, Slower, Change Voice, other suitable commands, or any combination thereof. Furthermore, the oral summary application may accept further voice commands from the user to control further processing of the oral summary. For example, the user may use a "Bookmark" command to instruct the oral summary application to bookmark an oral summary for future review. As another example, the user may use a "Repeat" command to instruct the oral summary application to repeat streaming of the oral summary at a later time. The user may also use oral commands to instruct the oral summary application to, for example, send the user a text version of the content record, record notes about the oral summary, or provide more content about the concepts in the oral summary.

In some embodiments, the oral summary document publishing system 510 may comprise a paired device data analyzer 514. The paired device data analyzer 514 may comprise one or more software algorithms implemented on and executed by one or more server-side devices associated with the oral summary system 150 as described below. The paired device data analyzer 514 may receive sensor data from the client-side connected device 130. The sensor data may be collected by one or more sensors of the client-side connected device 130, including, for example, environmental, physiology, or motion data. In some embodiments, the paired device data analyzer 514 may analyze the data obtained from the client-side connected device 130 and determine one or more wellness conditions of the user 160. The paired device data analyzer 514 may trigger the automated scheduler 513 to initiate an unscheduled streaming of an oral summary upon detection of certain wellness conditions of the user 160, such as laying down in the horizontal position, resting with no motion detected for a period of time, slow breathing or other similar conditions. If an already-computed oral summary is available at the time of the triggering event, the automated scheduler 513 may cause the streaming engine 512 to stream the computed oral summary. Otherwise, the automated scheduler 513 may cause the oral summary system 150 to author and stream a new oral summary based on the user's online learning activities and preferences.

The oral summary may be streamed to a client-side connected device 130 that may be a smart watch, a smart phone, a connected finger ring, a connected mattress, a connected pillow, a connected speaker, a connected audio headset, another suitable device, or any combination thereof. A client-side connected device 130 may directly play the oral summary (e.g., a smart phone playing the oral summary through a built-in speaker) or may play the oral summary by coordinating with another device (e.g., a smart watch playing the oral summary through a connected speaker).

In some embodiments, the paired device data analyzer 514 may detect a triggering event warranting streaming of an oral summary based on preset criteria. For example, the paired device data analyzer 514 may determine that a triggering event has occurred when the user's heartrate drops below a threshold value. As another example, the paired device data analyzer 514 may determine that a triggering event has occurred when no movement was detected in a threshold duration. In other embodiments, the criteria for detecting the triggering event may be dynamically adjusted by the oral summary system 150. The oral summary system 150 may comprise one or more machine-learning models controlling the criteria for detecting a triggering event for a particular user. The machine-learning models may be trained based on historical data associated with the particular user or a set of other users. As an example and without limitation, the oral summary system 150 or the oral summary application on the client-side connected device 130 may collect data regarding a particular user's sleep cycle information and record the user's heart rate prior to sleep and at different stages of sleep. A machine-learning model may be trained based on such data to determine the optimal heart rate to trigger streaming of oral summary. As another example and without limitation, the oral summary system 150 may collect data regarding the time it takes each of a group of users to fall asleep after oral summaries are streamed to her. A machine-learning model may be trained to set one or more criteria for initiating streaming, for terminating streaming, or for setting the duration of each oral summary.

In some embodiments, the automated scheduler 513 and the paired device data analyzer 514 may coordinate with each other to determine a time for streaming an oral summary to the user 160. The automated scheduler 513 may be configured with one or more periods in which streaming of oral summaries is permitted based on user preferences. Within the configured periods, an oral summary may be streamed to the user when the paired device data analyzer 514 detects a triggering event by analyzing physiological or movement data received from the connected device 130 of the user. Alternatively or additionally, the automated scheduler 513 may be configured with one or more scheduled times for streaming oral summaries based on user preferences. Oral summaries are streamed to the user if a triggering event is detected by the paired device data analyzer 514 within a time range from a scheduled time. As an example and without limitation, a user may schedule the streaming of an oral summary at 2:00 pm every day for nap time. The oral summary system 150 may not begin streaming an oral summary to the user until it detects a triggering event—that the user is in a rest position with slowed down heart rate—at 2:05 pm. Here, 2:05 pm may be within a period in which streaming is permitted or may be in sufficiently close proximity to the scheduled nap time.

Figure 6:
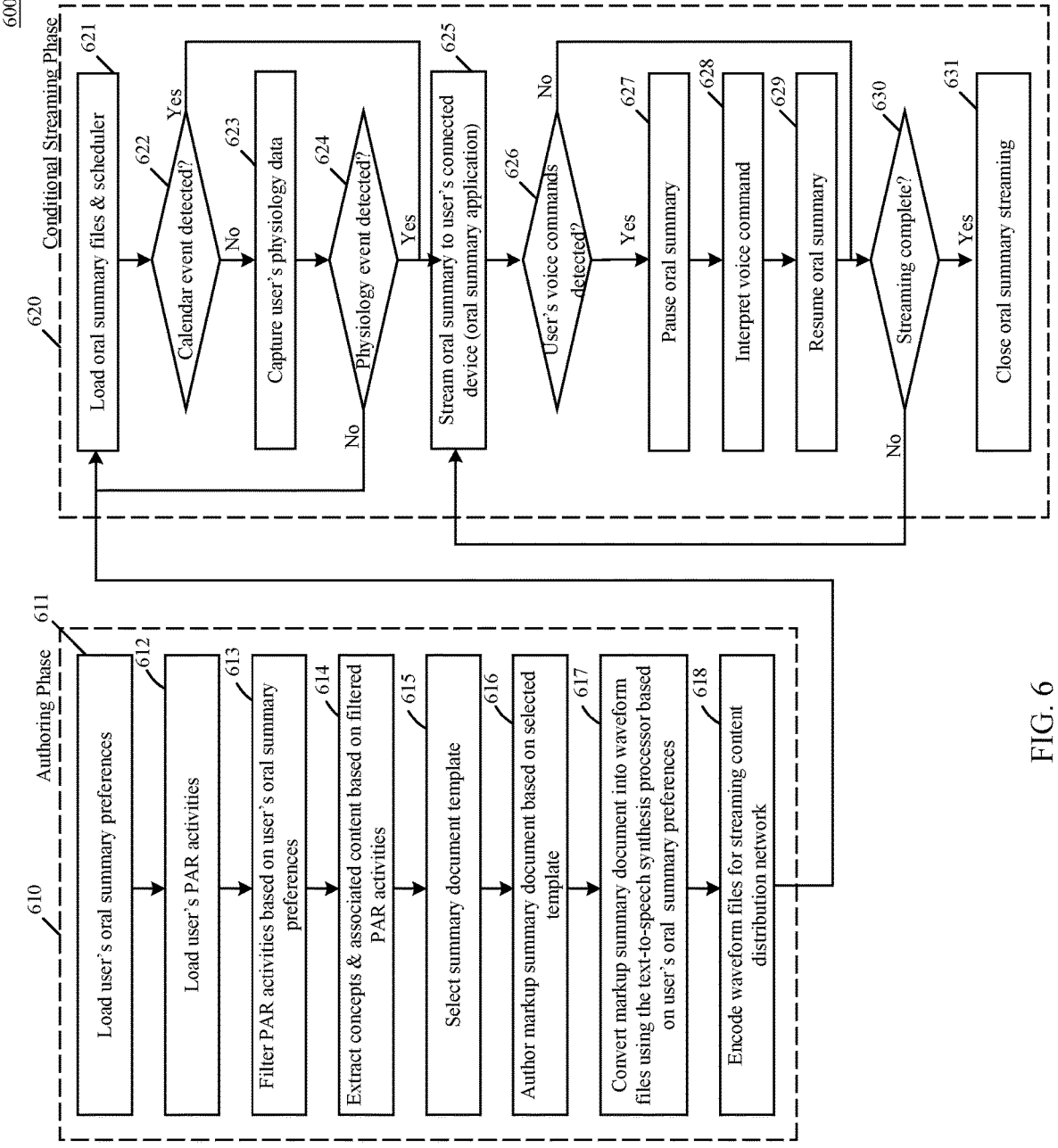
FIG. 6 illustrates an example process for automatically generating and delivering an oral summary of learning activities.

FIG. 6 illustrates an example process for automatically generating and delivering an oral summary of learning activities. The method 600 may be performed by one or more components of the environment or system illustrated by FIGS. 1, 2, 4, and 5, such as one or more components of the oral summary system 150. Depending on the implementation, the method 600 may include additional, fewer, or alternative steps performed in various orders or in parallel.

In some embodiments, the method 600 may include two phases: an authoring phase 610 and a conditional streaming phase 620. The authoring phase 610 may first generate one or more digital audio files that contain a computed oral summary. Then, in the conditional streaming phase 620, the one or more digital audio files corresponding to the oral summary are streamed to the client-side connected device 130 based on a set of conditions as determined by scheduling events and/or the detection of physiology events.

In some embodiments, the authoring phase 610 may start at step 611, where the oral summary system 150 may load a user's oral summary preferences. At step 612, the oral summary system 150 may load the user's PAR learning activities from the online education platform 110. At step 613, the oral summary system 150 may filter the PAR activities received from the online education platform 110 based on the user's oral summary preferences to identify the activities to be summarized. At step 614, the oral summary system 150 may extract one or more concepts from the filtered PAR activities of the user 160 and retrieve their associated content. At step 615, the oral summary system 150 may select one more summary document templates for creating a summary document corresponding to the filtered online learning activities of the user 160. At step 616, the oral summary system 150 may author a summary document based on the selected template, where the summary document may be created in a suitable markup format such as SSML. At step 617, the oral summary system may convert the summary document into an oral summary in a waveform format using the text-to-speech synthesis processor 410 based on the user's oral summary preferences. At step 618, the oral summary system may encode the oral summary into an audio file for streaming to the client-side connected device 130 over the network 140.

In some embodiments, the conditional streaming phase 620 may start at step 621 where, where the oral summary system 150 may load oral summary files and that were created in the authoring phase and the automated scheduler 513. At step 622 the oral summary system 150 may determine whether a calendar event has been detected. If yes, the oral summary system 150 may proceed to step 625 and initiate streaming of the oral summary to the user's client-side connected device 130 and the oral summary may then be played back by the oral summary application operating on the client-side connected device 130. If no calendar event is detected at step 622, the oral summary system 150 may continue to monitor the user's physiology data collected and sent by the client-side connected device 130 at step 623. At step 624, the oral summary system 150 may determine whether a physiology event is detected. If yes, the oral summary system may proceed to step 625 to stream the oral summary. If no, the method may revert to step 621, where the oral summary system 150 may continue to monitor and detect calendar events and/or physiology events. While the oral summary is being streamed to the user 160, the oral summary application on the client-side connected device 130 may perform step 626, where it is detected whether the user 160 makes a voice command. If a voice command is detected at step 626, the oral summary application may proceed to step 627, where it may pause the playback of the oral summary. At step 628, the oral summary application may interpret the voice command from the user 160. At step 629 the oral summary application may resume playback of the oral summary and control one or more features of the playback based on the user's voice command. At step 630, the oral summary application may determine if the streaming of the oral summary is complete. The streaming of the oral summary may be deemed complete if the audio file of the oral summary has been entirely played by the client-side connected device 130. Alternatively, the streaming may be deemed complete when a user command is received requesting completion of the streaming. If the streaming is determined to be complete at step 630, the oral summary application may proceed to step 631 to close the oral summary streaming by communicating with the oral summary system 150. If streaming is deemed not complete at step 630, the method may return to the step 625, where oral summary is continued to be streamed to the user 160.

Figure 7:
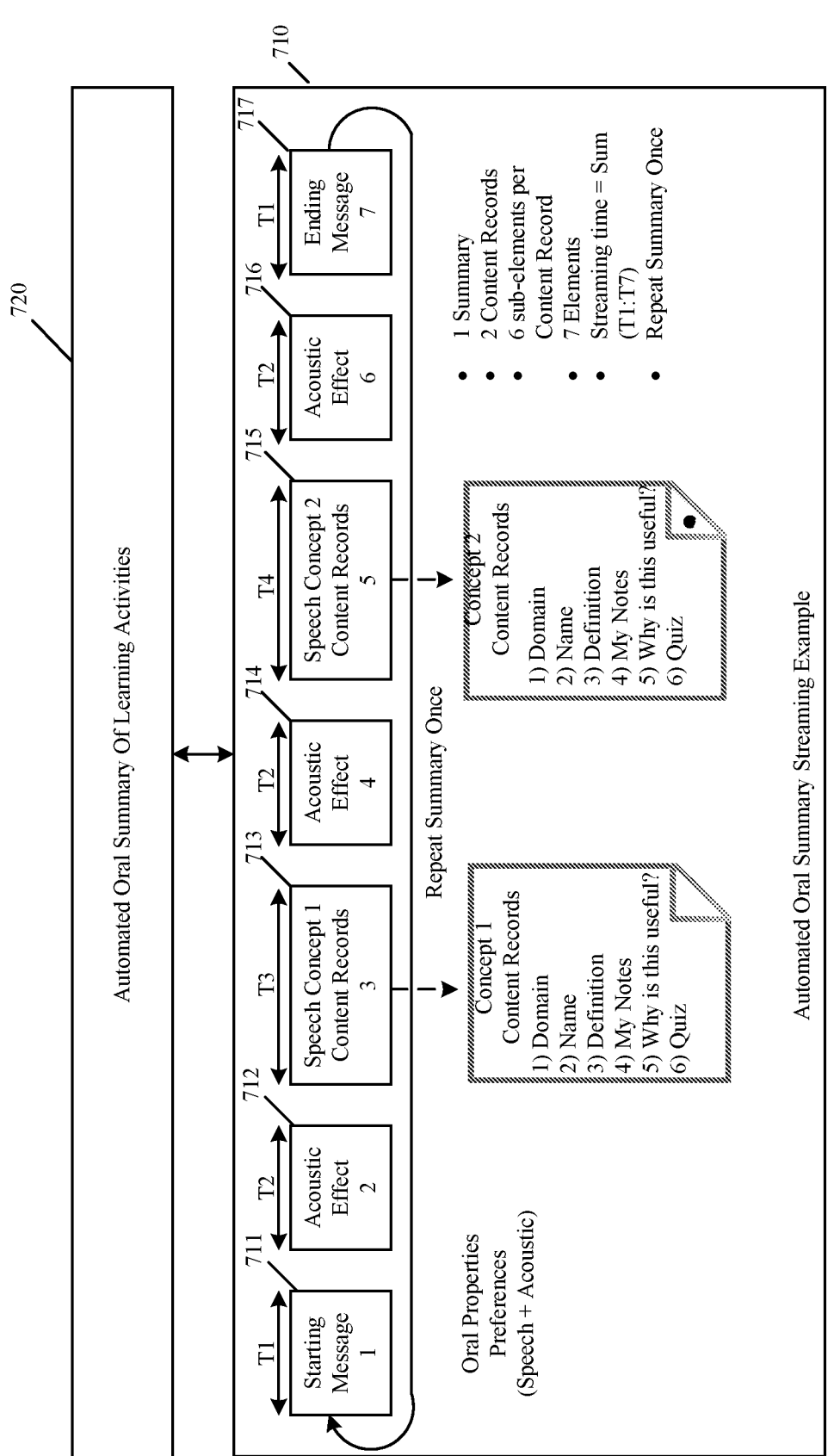
FIG. 7 illustrates an example structure of an automatically generated oral summary.

FIG. 7 illustrates an example structure of an automatically generated oral summary 710. As shown in FIG. 7, the oral summary 710 may comprise seven elements aggregated into a summary, which is then compiled into an audio file, encoded, and streamed to the client-side connected device 130. The oral summary 710 may be generated using a process of oral summary generation 720 as described herein, for example, according to the processes described in FIGS. 1, 2, and 4-6. The 1$^{st}$ Element 711 may comprise a short speech message, announcing the start of the oral summary 710. The short speech message may be a generic message, such as "This is the start of your automated summary," followed by a time stamp, such as "for Monday June 3$^{rd}$ 10 pm." The 2$^{nd}$ Element 712 may comprise a short acoustic effect, such as a bell or voice, and is used to focus the user 160 on the upcoming concept. The 3$^{rd}$ Element 713 may contain a first content record corresponding to a first concept associated with the user's online learning activities. The first content record may comprise one or more fields (e.g., "Domain", "Name", "Definition", "My Notes", "Why is this Useful" and "Quiz") related to the concept. The 5$^{th}$ Element 715 may contain a second content record corresponding to a second concept associated with the user's online learning activities. The second content record may be constructed based on the same template as the first content record and may include the same six fields. The 4$^{th}$ and 6$^{th}$ Elements 714 and 716 may be acoustic effects interleaved between subsequent concepts to mark a separation between them. Acoustic effects can be identical or different based on the user's preferences and selection from the speech and acoustic library 152. The 7$^{th}$ Element 717 may comprise a short speech message announcing the end of the oral summary 710.

Each element of the oral summary 710 may correspond to a certain duration, as indicated by, for example, T1, T2, T3, and T4 in FIG. 7. The duration of each element may be adjusted based on user preferences as to the total length of the oral summary. Furthermore, more or fewer elements (e.g., element corresponding to an additional content record) may be included in the oral summary 710. The oral summary 710 may also include a repetition of one or more elements.

Figure 8:
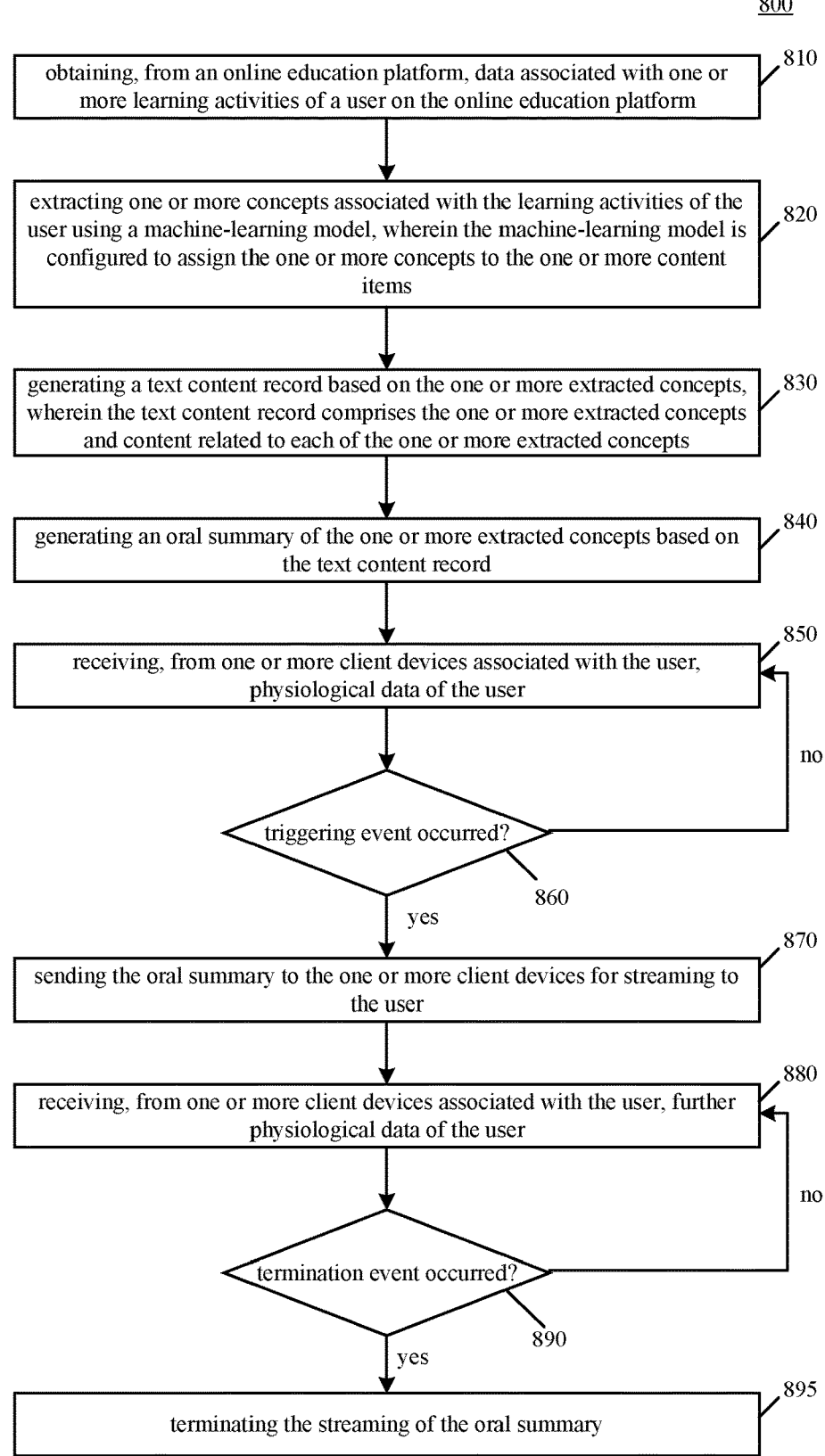
FIG. 8 illustrates an example method for automatically providing an oral summary based on learning activities.

FIG. 8 illustrates an example method 800 for automatically providing an oral summary based on learning activities. The method 800 may be performed by a device, apparatus, or system for automatically providing an oral summary based on learning activities. The method 800 may be performed by one or more components of the environment or system illustrated by FIGS. 1, 2, 4, and 5, such as one or more components of the oral summary system 150. Depending on the implementation, the method 800 may include additional, fewer, or alternative steps performed in various orders or in parallel.

Block 810 includes obtaining, from an online education platform, data associated with one or more learning activities of a user on the online education platform. The data indicate one or more content items associated with the learning activities.

Block 820 includes extracting one or more concepts associated with the learning activities of the user using a machine-learning model, wherein the machine-learning model is configured to assign the one or more concepts to the one or more content items.

Block 830 includes generating a text content record based on the one or more extracted concepts, wherein the text content record comprises the one or more extracted concepts and content related to each of the one or more extracted concepts. In some embodiments, generating a text content record based on the one or more extracted concepts comprises determining an order of the extracted concepts based on at least one of the following factors: a course associated with each extracted concept, a timing of a learning activity associated with each extracted concept, a level of difficulty of each extracted concept, or a type of content item to which each extracted concept is assigned.

Block 840 includes generating an oral summary of the one or more extracted concepts based on the text content record. In some embodiments, generating an oral summary of the one or more extracted concepts comprises generating the oral summary based on one or more preference settings of the user. The preference settings comprise at least one of a maximum duration of the oral summary, a maximum number of concepts in the oral summary, a number of repetitions of the oral summary, a characteristic of the voice in which the oral summary is rendered, a speech property of the text-to-speech conversion, or an acoustic effect to be included in the oral summary. In some embodiments, generating an oral summary of the one or more extracted concepts based on the text content record comprises generating one or more audio records associated with the text content record, wherein each of the one or more audio records is generated by text-to-speech conversion of a portion of the text content record corresponding to one of the one or more extracted concepts and the content related to the one extracted concept; and interleaving one or more acoustic effects between the one or more audio records to construct the oral summary.

Block 850 includes receiving, from one or more client devices associated with the user, physiological data of the user. In some embodiments, each of the one or more client devices is configured to collect the physiological data of the user or to play back the oral summary. The one or more client devices comprise at least one of a smart watch, a smart phone, a connected finger ring, a connected mattress, a connected pillow, a connected speaker, or a connected audio headset.

Block 860 includes detecting whether a triggering event has occurred based at least in part on the physiological data. If a triggering event is detected, the method proceeds to step 870. Otherwise, the method returns to block 850. In some embodiments, detecting a triggering event based at least in part on the physiological data comprises determining, based on the physiological data, that the user is in at least one of a plurality of target wellness conditions. The target wellness conditions include one or more of laying down in a horizontal position, having no motion for a preset period, breathing slowly, or having a slow heart rate. In some embodiments, the operations further comprise receiving one or more calendar settings from the user, the one or more calendar settings specify one or more times for automatically streaming oral summaries to the user; determining that a current time is one of the one or more times for automatically streaming oral summaries to the user; and sending the oral summary to the one or more client devices for streaming to the user.

Block 870 includes, in response to detecting the triggering event, sending the oral summary to the one or more client devices for streaming to the user.

Block 880 includes receiving, from one or more client devices associated with the user, further physiological data of the user.

Block 890 includes detecting, based at least in part on the further physiological data, whether at least one of one or more termination events has occurred, wherein the one or more termination events comprise that the user has fallen asleep or that the user has exited the at least one target wellness condition. If a termination event is detected, the method may proceed to step 895, where the streaming is terminated by sending an instruction to the one or more client devices to terminate the streaming of the oral summary. Otherwise, the method may return to step 880 to continue monitoring the user's physiological data.

Figure 9:
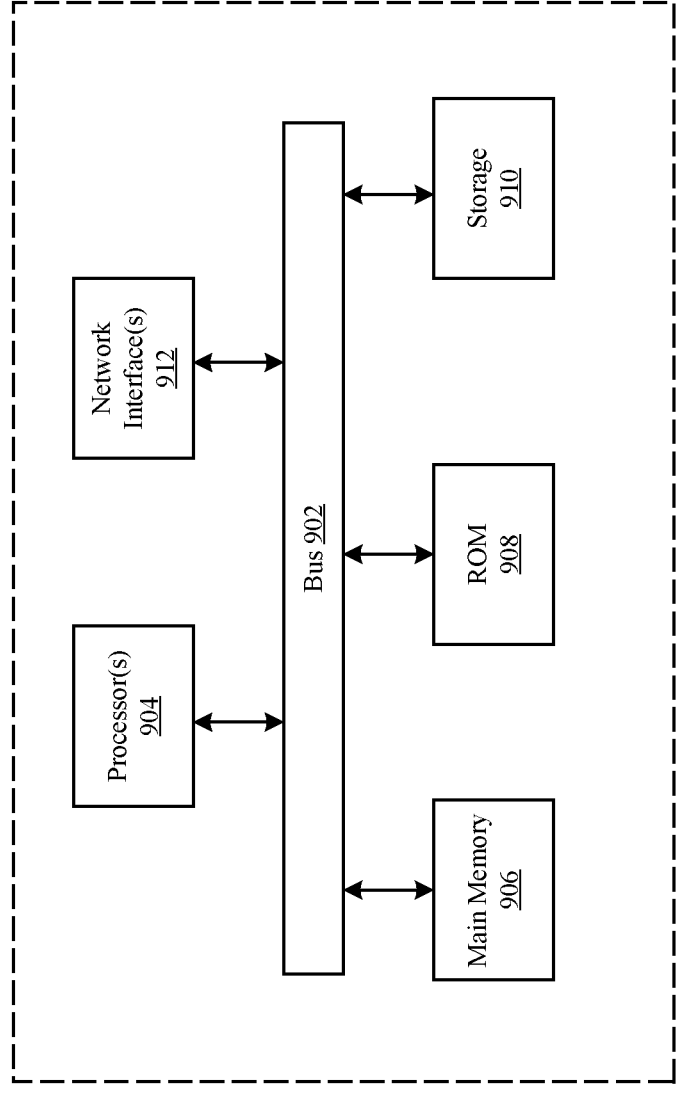
FIG. 9 illustrates a block diagram of a computer system in which any of the embodiments described herein may be implemented.

FIG. 9 illustrates a block diagram of an example computer system 900 in which any of the embodiments described herein may be implemented. The system 900 may be implemented in any of the components of the environments or systems illustrated in FIGS. 1, 2, 4, and 5. The software applications or services illustrated in FIGS. 1-8 may be implemented and operated on the system 900. One or more of the example methods illustrated by FIGS. 2, 4, 5, 6, and 8 may be performed by one or more implementations of the computer system 900.

The components of the computer system 900 may include any suitable physical form, configuration, number, type and/or layout. As an example, and not by way of limitation, the computer system 900 may include an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 900 may include one or more computer systems; be unitary or distributed; span multiple locations; span multiple machines; or reside in a cloud, which may include one or more cloud components in one or more networks.

In the depicted embodiment, the computer system 900 includes a bus 902, hardware processors 904, main memory 906, read only memory (ROM) 908, storage device 910 and network interface 912. Although a particular computer system is depicted having a particular number of particular components in a particular arrangement, this disclosure contemplates any suitable computer system having any suitable number of any suitable components in any suitable arrangement.

The computer system 900 can include a bus 902 or other communication mechanism for communicating information, one or more hardware processors 904 coupled with the bus 902 for processing information. Bus 902 may include any combination of hardware, software embedded in a computer readable medium and/or encoded logic incorporated in hardware or otherwise stored (e.g., firmware) to couple components of the computer system 900 to each other. As an example, and not by way of limitation, bus 902 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 902 may include any number, type and/or configuration of buses 902, where appropriate. In some embodiments, one or more buses 902 (which may each include an address bus and a data bus) may couple hardware processor(s) 904 to main memory 906. Bus 902 may include one or more memory buses.

The hardware processor(s) 904 may be, for example, one or more general purpose microprocessors, controller, or any other suitable computing device, resource, or combination of hardware, software and/or encoded logic operable to execute, either alone or in conjunction with other components. Such functionality may include providing various features discussed herein. In some embodiments, hardware processor(s) 904 may include hardware for executing instructions. As an example, and not by way of limitation, to execute instructions, processor 904 may retrieve (or fetch) instructions from an internal register, an internal cache, memory 906, or storage 910; decode and execute them; and then write one or more results to an internal register, an internal cache, memory 906, or storage 910.

In some embodiments, hardware processor(s) 904 may include one or more internal caches for data, instructions, or addresses. This disclosure contemplates hardware processor(s) 904 including any suitable number of any suitable internal caches, where appropriate. As an example, and not by way of limitation, hardware processor(s) 904 may include one or more instruction caches, one or more data caches and one or more translation lookaside buffers (TLBs). Instructions in the instruction caches may be copies of instructions in main memory 906 or storage device 910 and the instruction caches may speed up retrieval of those instructions by hardware processor(s) 904. Data in the data caches may be copies of data in main memory 906 or storage device 910 for instructions executing at hardware processor(s) 904 to operate on; the results of previous instructions executed at hardware processor(s) 904 for access by subsequent instructions executing at hardware processor(s) 904, or for writing to main memory 906, or storage device 910; or other suitable data. The data caches may speed up read or write operations by hardware processor(s) 904. The TLBs may speed up virtual-address translations for hardware processor(s) 904. In some embodiments, hardware processor(s) 904 may include one or more internal registers for data, instructions, or addresses. Depending on the embodiment, hardware processor(s) 904 may include any suitable number of any suitable internal registers, where appropriate. Where appropriate, hardware processor(s) 904 may include one or more arithmetic logic units (ALUs); be a multi-core processor; include one or more hardware processor(s) 904; or any other suitable processor.

The computer system 900 can also include a main memory 906, such as a random access memory (RAM), cache and/or other dynamic storage devices, coupled to the bus 902 for storing information and instructions to be executed by the hardware processor(s) 904. The main memory 906 may also be used for storing temporary variables or other intermediate information during execution of instructions by the hardware processor(s) 904. Such instructions, when stored in a storage media accessible to the hardware processor(s) 904, render the computer system 900 into a special-purpose machine that can be customized to perform the operations specified in the instructions.

In some embodiments, main memory 906 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Main memory 906 may include one or more memories 906, where appropriate. Main memory 906 may store any suitable data or information utilized by the computer system 900, including software embedded in a computer readable medium and/or encoded logic incorporated in hardware or otherwise stored (e.g., firmware). In some embodiments, main memory 906 may include main memory for storing instructions for hardware processor(s) 904 to execute or data for hardware processor(s) 904 to operate on. In some embodiments, one or more memory management units (MMUs) may reside between hardware processor(s) 904 and main memory 906 and facilitate accesses to main memory 906 requested by hardware processor(s) 904.

The computer system 900 can further include a read only memory (ROM) 908 or other static storage device coupled to the bus 902 for storing static information and instructions for the hardware processor(s) 904. A storage device 910, such as a magnetic disk, optical disk, or USB thumb drive (Flash drive), etc., can be provided and coupled to the bus 902 for storing information and instructions.

As an example, and not by way of limitation, the computer system 900 may load instructions from storage device 910 or another source (such as, for example, another computer system) to main memory 906. Hardware processor(s) 904 may then load the instructions from main memory 906 to an internal register or internal cache. To execute the instructions, hardware processor(s) 904 may retrieve the instructions from the internal register or internal cache and decode them. During or after execution of the instructions, hardware processor(s) 904 may write one or more results (which may be intermediate or final results) to the internal register or internal cache. Hardware processor(s) 904 may then write one or more of those results to main memory 906. In some embodiments, hardware processor(s) 904 may execute only instructions in one or more internal registers or internal caches or in main memory 906 (as opposed to storage device 910 or elsewhere) and may operate only on data in one or more internal registers or internal caches or in main memory 906 (as opposed to storage device 910 or elsewhere).

In some embodiments, storage device 910 may include mass storage for data or instructions. As an example, and not by way of limitation, storage device 910 may include a hard disk drive (HDD), a floppy disk drive, flash memory, an optical disc, a magneto-optical disc, magnetic tape, or a Universal Serial Bus (USB) drive or a combination of two or more of these. Storage device 910 may include removable or non-removable (or fixed) media, where appropriate. Storage device 910 may be internal or external to the computer system 900, where appropriate. In some embodiments, storage device 910 may be non-volatile, solid-state memory. In some embodiments, storage device 910 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage device 910 may take any suitable physical form and may include any suitable number or type of storage. Storage device 910 may include one or more storage control units facilitating communication between hardware processor(s) 904 and storage device 910, where appropriate.

Computer system 900 can further include at least one network interface 912. In some embodiments, network interface 912 may include hardware, encoded software, or both providing one or more interfaces for communication (such as, for example, packet-based communication) among any networks, any network devices and/or any other computer systems. As an example, and not by way of limitation, network interface 912 may include a network interface controller (NIC), network adapter, or the like, or a combination thereof, coupled to the bus 902 for communicating the computer system 900 to at least one network with an Ethernet or other wire-based network and/or a wireless NIC (WNIC) or wireless adapter for communicating with a wireless network.

Depending on the embodiment, network interface 912 may be any type of interface suitable for any type of network for which computer system 900 is used. As an example, and not by way of limitation, computer system 900 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 can include (or communicate with) a wireless PAN (WPAN) (such as, for example, a BLU-ETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 900 may include any suitable network interface 912 for any one or more of these networks, where appropriate.

In some embodiments, network interface 912 may include one or more interfaces for one or more I/O devices. One or more of these I/O devices may enable communication between a person and the computer system 900. As an example, and not by way of limitation, an I/O device may include a keyboard, keypad, microphone, monitor, mouse, printer, scanner, speaker, still camera, stylus, tablet, touch-screen, trackball, video camera, another suitable I/O device or a combination of two or more of these. An I/O device may include one or more sensors. Some embodiments may include any suitable type and/or number of I/O devices and any suitable type and/or number of network interface 912 for them. Where appropriate, may include one or more drivers enabling hardware processor(s) 904 to drive one or more of these I/O devices. Network interface 912 may include one or more network interface 912, where appropriate.

In general, the word "component," "modules," "engine," "system," "database," and the like, as used herein, can refer to logic embodied in hardware or firmware, or to a collection of software instructions, possibly having entry and exit points, written in a programming language, such as, for example, Java, C or C++. A software component or module may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices, such as the computing system 900, may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of an executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques or technology described herein using customized hard-wired logic, one or more ASICs or FPGAs, firmware and/or program logic which in combination with the computer system 900 that causes or programs the computer system 900 to be a special-purpose machine. According to one or more examples, the techniques described herein are performed by the computer system 900 in response to the hardware processor(s) 904 executing one or more sequences of one or more instructions contained in the main memory 906. Such instructions may be read into the main memory 906 from another storage medium, such as the storage device 910. Execution of the sequences of instructions contained in the main memory 906 can cause the hardware processor(s) 904 to perform process steps described herein. In alternative examples, hard-wired circuitry may be used in place of or in combination with software instructions.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Some embodiments may include one or more computer-readable storage media implementing any suitable storage. In some embodiments, a computer-readable storage medium implements one or more portions of hardware processor(s) 904 (such as, for example, one or more internal registers or caches), one or more portions of memory 620, one or more portions of storage device 910, or a combination of these, where appropriate. In some embodiments, a computer-readable storage medium implements RAM or ROM. In some embodiments, a computer-readable storage medium implements volatile or persistent memory. In some embodiments, one or more computer-readable storage media embody encoded software.

The term "non-transitory media," and similar terms, as used herein refers to any media that store data and/or instructions that cause a machine to operate in a specific fashion. Such non-transitory media may comprise non-volatile media and/or volatile media. The non-volatile media can include, for example, optical or magnetic disks, such as the storage device 910. The volatile media can include dynamic memory, such as the main memory 906. Common forms of the non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The non-transitory media is distinct from but may be used in conjunction with transmission media. The transmission media can participate in transferring information between the non-transitory media. For example, the transmission media can include coaxial cables, copper wire and fiber optics, including the wires that comprise the bus 902. The transmission media can also take a form of acoustic or light waves, such as those generated during radio-wave and infra-red data communications.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In some embodiments, encoded software includes one or more application programming interfaces (APIs) stored or encoded in a computer-readable storage medium. Some embodiments may use any suitable encoded software written or otherwise expressed in any suitable programming language or combination of programming languages stored or encoded in any suitable type or number of computer-readable storage media. In some embodiments, encoded software may be expressed as source code or object code. In some embodiments, encoded software is expressed in a higher-level programming language, such as, for example C, Perl, or a suitable extension thereof. In some embodiments, encoded software is expressed in a lower-level programming language, such as assembly language (or machine code). In some embodiments, encoded software is expressed in JAVA. In some embodiments, encoded software is expressed in Hyper Text Markup Language (HTML), Extensible Markup Language (XML), or other suitable markup language. The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in some embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in some embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

As used herein, the term "or" may be construed in either an inclusive or exclusive sense. Moreover, the description of resources, operations, or structures in the singular shall not be read to exclude the plural. Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to some embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

The invention claimed is:

1. A system for automatically providing an oral summary based on learning activities, comprising one or more processors and a non-transitory computer readable medium storing instructions that, when executed by the one or more processors, cause the system to perform operations comprising:

obtaining, from an online education platform, data associated with one or more learning activities of a user on the online education platform, the data indicating one or more content items associated with the learning activities;

extracting one or more concepts associated with the learning activities of the user using a machine-learning model, wherein the machine-learning model is configured to assign the one or more concepts to the one or more content items;

receiving, from one or more client devices associated with the user, physiological data of the user;

detecting a triggering event based at least in part on the physiological data;

in response to detecting the triggering event, and in response to determining an absence of an already computed oral summary of the one or more extracted concepts, generating an oral summary of the one or more extracted concepts, wherein the generated oral summary is based on an instantaneous learning status of the user corresponding to a time instance at which the triggering event was detected; and sending the generated oral summary to the one or more client devices for streaming to the user.

2. The system of claim 1, wherein detecting a triggering event based at least in part on the physiological data comprises:

determining, based on the physiological data, that the user is in at least one of a plurality of target wellness conditions, wherein the target wellness conditions are based on one or more of:

laying down in a horizontal position;

having no motion for a preset period;

breathing at a rate of below a threshold breathing rate; or having a slow heart rate of below a threshold heart rate.

3. The system of claim 2, wherein the operations further comprise:

detecting, based at least in part on the physiological data, that at least one of one or more termination events has occurred, wherein the one or more termination events comprise that the user has fallen asleep or that the user has exited the at least one target wellness condition; and in response to detecting the termination event, sending a command to the one or more client devices to terminate the streaming of the oral summary.

4. The system of claim 1, wherein each of the one or more client devices is configured to collect the physiological data of the user or to play back the oral summary and the one or more client devices comprise at least one of:

a smart watch;

a smart phone;

a connected finger ring;

a connected mattress;

a connected pillow;

a connected speaker; or a connected audio headset.

5. The system of claim 1, wherein generating an oral summary of the one or more extracted concepts comprises generating the oral summary based on one or more preference settings of the user, the preference settings comprising at least one of:

a maximum duration of the oral summary;

a maximum number of concepts in the oral summary;

a number of repetitions of the oral summary;

a characteristic of the voice in which the oral summary is rendered;

a speech property of the text-to-speech conversion; or an acoustic effect to be included in the oral summary.

6. The system of claim 1, wherein the instructions that, when executed by the one or more processors, further cause the system to perform operations comprising:

generating a text content record based on the one or more extracted concepts by determining an order of the extracted concepts based on at least one of the following factors:

a course associated with each extracted concept;

a timing of a learning activity associated with each extracted concept;

a level of difficulty of each extracted concept; or a type of content item to which each extracted concept is assigned.

7. The system of claim 1, wherein the operations further comprise:

receiving one or more calendar settings from the user, the one or more calendar settings specify one or more times for automatically streaming oral summaries to the user;

determining that a current time is one of the one or more times for automatically streaming oral summaries to the user; and sending the oral summary to the one or more client devices for streaming to the user.

8. The system of claim 1, wherein generating an oral summary of the one or more extracted concepts comprises:

generating one or more audio records associated with a text content record, wherein each of the one or more audio records is generated by text-to-speech conversion of a portion of the text content record corresponding to one of the one or more extracted concepts and the content related to the one extracted concept; and interleaving one or more acoustic effects between the one or more audio records to construct the oral summary.

9. A computer-implemented method for automatically providing an oral summary based on learning activities, comprising:

obtaining, from an online education platform, data associated with one or more learning activities of a user on the online education platform, the data indicating one or more content items associated with the learning activities;

extracting one or more concepts associated with the learning activities of the user using a machine-learning model, wherein the machine-learning model is configured to assign the one or more concepts to the one or more content items;

receiving, from one or more client devices associated with the user, physiological data of the user;

detecting a triggering event based at least in part on the physiological data;

in response to detecting the triggering event, and in response to determining an absence of an already computed oral summary of the one or more extracted concepts, generating an oral summary of the one or more extracted concepts, wherein the generated oral summary is based on an instantaneous learning status of the user corresponding to a time instance at which the triggering event was detected; and sending the generated oral summary to the one or more client devices for streaming to the user.

10. The method of claim 9, wherein detecting a triggering event based at least in part on the physiological data comprises:

determining, based on the physiological data, that the user is in at least one of a plurality of target wellness conditions, wherein the target wellness conditions include one or more of:

laying down in a horizontal position;

having no motion for a preset period;

breathing at a rate of below a threshold breathing rate; or having a heart rate of below a threshold heart rate.

11. The method of claim 10, further comprising:

detecting, based at least in part on the physiological data, that at least one of one or more termination events has occurred, wherein the one or more termination events comprise that the user has fallen asleep or that the user has exited the at least one target wellness condition; and in response to detecting the termination event, sending a command to the one or more client devices to terminate the streaming of the oral summary.

12. The method of claim 9, wherein each of the one or more client devices is configured to collect the physiological data of the user or to play back the oral summary and the one or more client devices comprise at least one of:

a smart watch;

a smart phone;

a connected finger ring;

a connected mattress;

a connected pillow;

a connected speaker; or a connected audio headset.

13. The method of claim 9, wherein generating an oral summary of the one or more extracted concepts comprises generating the oral summary based on one or more preference settings of the user, the preference settings comprising at least one of:

a maximum duration of the oral summary;

a maximum number of concepts in the oral summary;

a number of repetitions of content in the oral summary;

a characteristic of a voice in which the oral summary is rendered;

a speech property of the text-to-speech conversion; or an acoustic effect to be included in the oral summary.

14. The method of claim 9, further comprising generating a text content record based on the one or more extracted concepts by determining an order of the extracted concepts based on at least one of the following factors:

a course associated with each extracted concept;

a timing of a learning activity associated with each extracted concept;

a level of difficulty of each extracted concept; or a type of content item to which each extracted concept is assigned.

15. The method of claim 9, further comprising:

receiving one or more calendar settings from the user, the one or more calendar settings specify one or more times for automatically streaming oral summaries to the user;

determining that a current time is one of the one or more times for automatically streaming oral summaries to the user; and sending the oral summary to the one or more client devices for streaming to the user.

16. The method of claim 9, wherein generating an oral summary of the one or more extracted concepts comprises:

generating one or more audio records associated with a text content record, wherein each of the one or more audio records is generated by text-to-speech conversion of a portion of the text content record corresponding to one of the one or more extracted concepts and the content related to the one extracted concept; and interleaving one or more acoustic effects between the one or more audio records to construct the oral summary.

17. A non-transitory computer-readable storage medium for automatically providing an oral summary based on learning activities, configured with instructions executable by one or more processors to cause the one or more processors to perform operations comprising:

obtaining, from an online education platform, data associated with one or more learning activities of a user on the online education platform, the data indicating one or more content items associated with the learning activities;

extracting one or more concepts associated with the learning activities of the user using a machine-learning model, wherein the machine-learning model is configured to assign the one or more concepts to the one or more content items;

receiving, from one or more client devices associated with the user, physiological data of the user;

detecting a triggering event based at least in part on the physiological data;

in response to detecting the triggering event, and in response to determining an absence of an already computed oral summary of the one or more extracted concepts, generating an oral summary of the one or more extracted concepts, wherein the generated oral summary is based on an instantaneous learning status of the user corresponding to a time instance at which the triggering event was detected; and sending the generated oral summary to the one or more client devices for streaming to the user.

18. The system of claim 1, further comprising:

in response to the physiological data vacillating between being sufficient to satisfy the triggering event and being insufficient to satisfy the triggering event, switching between a transmitting mode and a non-transmitting mode, wherein during the transmitting mode, the generated oral summary is transmitted and during the non-transmitting mode, transmission of the generated oral summary is terminated.

19. The system of claim 1, wherein the instructions that, when executed by the one or more processors, further cause the system to perform:

adjusting one or more bit rates to encode the oral summary based on one or more statuses of one or more network connections between the one or more client devices and the system.

20. The system of claim 1, wherein the triggering event comprises a first triggering event at a first time instance based on first physiological data corresponding to the first time instance, the oral summary comprises a first oral summary generated based on a first learning status of the user at the first time instance, and the instructions that, when executed by the one or more processors, further cause the system to perform:

detecting a second triggering event based on second physiological data at a second time instance;

in response to detecting the second triggering event, and in response to determining an absence of an already computed second oral summary of the one or more extracted concepts, generating a second oral summary of the one or more extracted concepts based on a second learning status of the user at the second time instance.

* * * * *